United States Patent
Enomoto et al.

(10) Patent No.: US 9,657,861 B2
(45) Date of Patent: May 23, 2017

(54) FLOW PASSAGE SWITCHING UNIT

(71) Applicant: DENSO CORPORATION, Kariya, Aichi-pref. (JP)

(72) Inventors: Norihiko Enomoto, Nagoya (JP); Michio Nishikawa, Nagoya (JP); Nobuharu Kakehashi, Toyoake (JP); Kengo Sugimura, Kariya (JP); Yoshiki Katoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 63 days.

(21) Appl. No.: 14/391,588

(22) PCT Filed: Mar. 14, 2013

(86) PCT No.: PCT/JP2013/001711
§ 371 (c)(1),
(2) Date: Oct. 9, 2014

(87) PCT Pub. No.: WO2013/157194
PCT Pub. Date: Oct. 24, 2013

(65) Prior Publication Data
US 2015/0101693 A1    Apr. 16, 2015

(30) Foreign Application Priority Data

Apr. 17, 2012  (JP) .................................. 2012-094044
Feb. 22, 2013  (JP) .................................. 2013-033692

(51) Int. Cl.
*F16K 27/00*    (2006.01)
*F16K 31/53*    (2006.01)
(Continued)

(52) U.S. Cl.
CPC .......... *F16K 27/003* (2013.01); *F16K 11/165* (2013.01); *F16K 11/22* (2013.01);
(Continued)

(58) Field of Classification Search
CPC ...... F16K 31/535; F16K 31/04; F16K 11/165; F16K 11/22; Y10T 137/87249
(Continued)

(56) References Cited

U.S. PATENT DOCUMENTS

2003/0127528 A1    7/2003  Sabhapathy et al.
2009/0090415 A1*   4/2009  Harris .................. F16K 27/003
                                                        137/7
(Continued)

FOREIGN PATENT DOCUMENTS

JP    2002243051 A    8/2002
JP    2002250455 A    9/2002
(Continued)

OTHER PUBLICATIONS

International Search Report and Written Opinion (in Japanese with English Translation) for PCT/JP2013/001711, mailed Jun. 11, 2013; ISA/JP.

(Continued)

*Primary Examiner* — Mary McManmon
*Assistant Examiner* — Patrick Williams
(74) *Attorney, Agent, or Firm* — Harness, Dickey & Pierce, P.L.C.

(57) ABSTRACT

A flow passage switching unit includes side-by-side arranged rotary valve parts. The valve part includes a casing, side walls, a peripheral wall, first fluid ports, a second fluid port, a rotary shaft, and a valving element. A flow passage, through which the first fluid ports and the second fluid port selectively communicate, is formed by rotation of the valving element. The unit includes a driving mechanism driving each valving element by its corresponding predetermined rotation angle. The driving mechanism includes one driving source, and a motive power transmission member transmitting rotation motive power of the driving source respectively (Continued)

to the valve parts. Motive power of the driving source is transmitted to each rotary shaft of the valve parts to drive each valving element to a position, which position of the valving element relative to the first and second fluid ports is different from one another among the valve parts.

7 Claims, 31 Drawing Sheets

(51) Int. Cl.
*F16K 11/16* (2006.01)
*F16K 31/04* (2006.01)
*F16K 11/22* (2006.01)

(52) U.S. Cl.
CPC .............. *F16K 31/04* (2013.01); *F16K 31/53* (2013.01); *F16K 31/535* (2013.01); *Y10T 137/87249* (2015.04)

(58) Field of Classification Search
USPC .... 137/565.33, 614.11, 637, 565.31, 625.19, 137/601.08, 898, 607, 876, 637.3, 625.41
See application file for complete search history.

(56) References Cited

U.S. PATENT DOCUMENTS

2010/0282190 A1    11/2010  Stoermer
2012/0060954 A1*   3/2012   Na ...................... B60L 11/1888
                                                       137/625.41

FOREIGN PATENT DOCUMENTS

| JP | 2003262127 A | 9/2003 |
| JP | 2008267528 A | 11/2008 |
| JP | 2009097649 A | 5/2009 |
| JP | 2010507762 A | 3/2010 |
| JP | 2011058686 A | 3/2011 |
| JP | 2012180134 A | 9/2012 |

OTHER PUBLICATIONS

Partial International Search Report for PCT/JP2013/001711, mailed Apr. 16, 2013; ISA/JP.
Office Action mailed on Jan. 26, 2016 in corresponding Japanese Application No. 2013-033692 with English translation.

* cited by examiner

| VALVE 1 OPERATION ANGLE | FIRST VALVE | SECOND VALVE | THIRD VALVE |
|---|---|---|---|
| 0° | | | |
| 50° | | | |
| 67° | | | |
| 110° | | | |
| 120° | | | |
| 147° | | | |
| 210° | | | |
| 315° | | | |

FIG. 31

| VALVING ELEMENT ROTATION ANGLE [deg] | VALVING ELEMENT B (4way45°) | 0 | 45 | 90 | 135 | 180 | 225 | 270 | 315 | 360 | 405 | 450 | 495 | 540 | 585 | 630 |
|---|---|---|---|---|---|---|---|---|---|---|---|---|---|---|---|---|
| | VALVING ELEMENT A (4way36°) | 0 | 36 | 72 | 108 | 144 | 180 | 216 | 252 | 288 | 324 | 360 | 396 | 432 | 468 | 504 |
| DISCHARGE PORT COMMUNICATION | DISCHARGE PORT a | 2 | 2 | 1 | 1 | 2 | 2 | 1 | 1 | 2 | 2 | 1 | 1 | 2 | 2 | 1 |
| | DISCHARGE PORT b | 1 | 1 | 2 | 2 | 1 | 1 | 2 | 2 | 1 | 1 | 2 | 2 | 1 | 1 | 2 |
| | DISCHARGE PORT c | 2 | 1 | null | 2 | 1 | null | null | null | null | 2 | 2 | 2 | 1 | null | 1 |
| | DISCHARGE PORT d | 2 | 2 | null | 1 | 1 | null | null | null | null | 2 | 2 | 2 | null | null | 1 |
| OPERATION PATTERN | | 1 | 2 | 3 | 4 | | | | | | | 5 | 6 | 7 | | 8 |

FLOW PASSAGE SWITCHING UNIT : OPERATION PATTERN 5

VALVING ELEMENT A=360°, VALVING ELEMENT B=450°

| VALVING ELEMENT ROTATION ANGLE [deg] | VALVING ELEMENT B (4way45°) | 270 | 315 | 360 | 405 | 450 | 495 |
|---|---|---|---|---|---|---|---|
| | VALVING ELEMENT A (4way36°) | 216 | 252 | 288 | 324 | 360 | 396 |
| DISCHARGE PORT COMMUNICATION | DISCHARGE PORT a | 1 | 1 | 2 | 2 | 1 | 1 |
| | DISCHARGE PORT b | 2 | 2 | 1 | 1 | 2 | 2 |
| | DISCHARGE PORT c | null | null | null | 2 | 2 | 1 |
| | DISCHARGE PORT d | null | null | null | 2 | 2 | 2 |
| OPERATION PATTERN | | | | | | 5 | 6 |

FLOW PASSAGE SWITCHING UNIT : OPERATION PATTERN 7

VALVING ELEMENT A=468°, VALVING ELEMENT B=585°

| VALVING ELEMENT ROTATION ANGLE [deg] | VALVING ELEMENT B (4way45°) | 450 | 495 | 540 | 585 | 630 |
|---|---|---|---|---|---|---|
| | VALVING ELEMENT A (4way36°) | 360 | 396 | 432 | 468 | 504 |
| DISCHARGE PORT COMMUNI- CATION | DISCHARGE PORT a | 1 | 1 | 2 | 2 | 1 |
| | DISCHARGE PORT b | 2 | 2 | 1 | 1 | 2 |
| | DISCHARGE PORT c | 2 | 1 | null | 2 | 1 |
| | DISCHARGE PORT d | 2 | 2 | null | 1 | 1 |
| OPERATION PATTERN | | 5 | 6 | | 7 | 8 |

FLOW PASSAGE SWITCHING UNIT : OPERATION PATTERN 8

VALVING ELEMENT A=504°, VALVING ELEMENT B=630°

| VALVING ELEMENT ROTATION ANGLE [deg] | VALVING ELEMENT B (4way45°) | 495 | 540 | 585 | 630 |
|---|---|---|---|---|---|
| | VALVING ELEMENT A (4way36°) | 396 | 432 | 468 | 504 |
| DISCHARGE PORT COMMUNI-CATION | DISCHARGE PORT a | 1 | 2 | 2 | 1 |
| | DISCHARGE PORT b | 2 | 1 | 1 | 2 |
| | DISCHARGE PORT c | 1 | null | 2 | 1 |
| | DISCHARGE PORT d | 2 | null | 1 | 1 |
| OPERATION PATTERN | | 6 | | 7 | 8 |

FLOW PASSAGE SWITCHING UNIT

CROSS-REFERENCE TO RELATED APPLICATIONS

This application is a U.S. National Phase Application under 35 U.S.C. 371 of International Application No. PCT/JP2013/001711 filed on Mar. 14, 2013 and published in Japanese as WO 2013/157194 A1 on Oct. 24, 2013. This application is based on and claims the benefit of priority from Japanese Patent Application No. 2012-094044 filed on Apr. 17, 2012 and Japanese Patent Application No. 2013-033692 filed on Feb. 22, 2013. The entire disclosures of all of the above applications are incorporated herein by reference.

TECHNICAL FIELD

The present disclosure relates to a flow passage switching unit to transmit motive power to plural rotary valves by using a single driving source, and drive respective valving elements in the respective rotary valves until their positions with respect to first fluid port and second fluid port become mutually different among the plural rotary valves.

BACKGROUND ART

Conventionally, a multi-directional switching valve described in Patent Literature 1 is known. This valve has a simple structure to switch air supply to plural systems, and has a flow passage portion, flow passage switching means, driving means and control means to obtain a multi-directional switching valve which can be downsized.

The flow passage portion has a cylindrical-shaped cylinder provided with a suction portion and plural delivery portions, and further, the flow passage switching means has a movable valve provided in the cylinder and a piston rod connected to the movable valve. Further, the end of the piston rod is connected to the driving means, and the piston rod is linearly moved with the driving means, to open/close the fluid passage.

PRIOR ART LITERATURE

Patent Literature

[Patent Literature 1] JP-A-2002-250455

According to the technique of the above-described Patent Literature 1, disclosed is a flow passage switching unit, in which two or more plural flow passages selectively corresponding to fluid in two systems (for example, warm water and cold water) exist, as the piston rod which can be regarded as a common shaft is linearly moved with the single driving means. In this flow passage switching unit, when the number of plural fluid passages is increased, the structure is linearly long, which degrades mountability in a vehicle or the like. Further, even when the common shaft is linearly driven in an axial direction to switch the flow passage, the number of flow passage switchings is small.

SUMMARY OF INVENTION

The present disclosure has been made in view of the problems existing in such conventional techniques. It is an object of the present disclosure to obtain a flow passage switching unit, having plural rotary valves having first fluid port and second fluid port with at least one fluid piping, capable of switching a large number of flow passages with a single driving source.

To achieve the above object, a flow passage switching unit in one aspect of the present disclosure includes a plurality of rotary valve parts and a driving mechanism. The plurality of rotary valve parts are arranged side by side. Each of the plurality of rotary valve parts includes a casing, side walls, a peripheral wall, at least one first fluid port, at least one second fluid port, a rotary shaft, and a valving element. The casing defines therein a space. The side walls are opposed to each other. The peripheral wall is formed between the side walls. The at least one first fluid port is provided for the peripheral wall. The at least one second fluid port is provided for the peripheral wall or a part of the side walls. The rotary shaft extends in a direction connecting the opposed side walls in the casing. The valving element is supported rotatably by the rotary shaft. A flow passage, through which the at least one first fluid port and the at least one second fluid port selectively communicate with each other, is formed by rotation of the valving element. The driving mechanism drives the valving element by its corresponding predetermined rotation angle, and includes a single driving source and a motive power transmission member. The motive power transmission member transmits rotation motive power of the single driving source respectively to the plurality of rotary valve parts. The motive power transmission member transmits the motive power of the single driving source to the rotary shaft to drive the valving element to a position, the position of the valving element relative to the at least one first fluid port and the at least one second fluid port being different from one another among the plurality of rotary valve parts.

With this arrangement, it is possible to have plural rotary valves each having first fluid port and second fluid port and to switch plural flow passages with a single driving power. Further, as it is formed of the plural rotary valves, the entire length in the rotation axis direction can be shortened, and switching can be performed among a comparatively large number of flow passages.

BRIEF DESCRIPTION OF DRAWINGS

The above and other objects, features and advantages of the present disclosure will become more apparent from the following detailed description made with reference to the accompanying drawings. In the drawings:

FIG. 31 is an operation table showing the flow of the fluid in the respective rotary valves in the above-described eighth embodiment;

FIG. 35 is an explanatory diagram showing the flow of the fluid in an operation pattern 5 in the above-described eighth embodiment, when the valving element rotation angles of the valving elements of the respective rotary valves are 360 degrees and 450 degrees;

EMBODIMENTS FOR CARRYING OUT INVENTION

Figure 1:
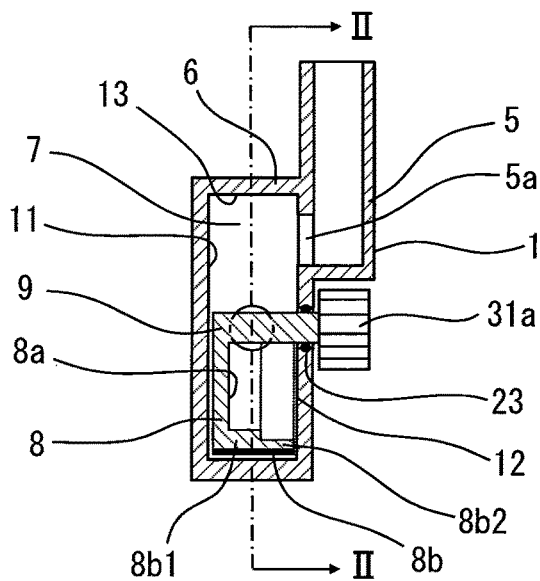
FIG. 1 is a partial longitudinal cross-sectional diagram of a rotary valve in a flow passage switching unit in a first embodiment, along an arrow I-I line in FIG. 2.

Hereinbelow, plural embodiments will be described with reference to the drawings. In the respective embodiments, elements corresponding to items described in the preceding embodiments have the same reference numerals and repeated explanations will be omitted in some cases. In the respective embodiments, when a part of the constituent elements is described, regarding the other part of the constituent elements, the previously described other embodiments are applicable.

In the respective embodiments, not only combinations of elements explicitly defined as possible particular combinations but also embodiments themselves may be partially combined even though such combinations are not explicitly defined as long as there is no obstacle especially in the combination.

First Embodiment

Hereinbelow, a first embodiment will be described in detail using FIG. 1 to FIG. 11. A rotary valve 1 in FIG. 1 has a rotary type three way valve. The rotary valve 1 has a left side piping (also referred to as one side pipe) 4L and a right side piping (also referred to as the other side pipe) 4R forming a first fluid port, and a second fluid port 5. The second fluid port 5 in this embodiment forms a discharge piping.

Figure 4:
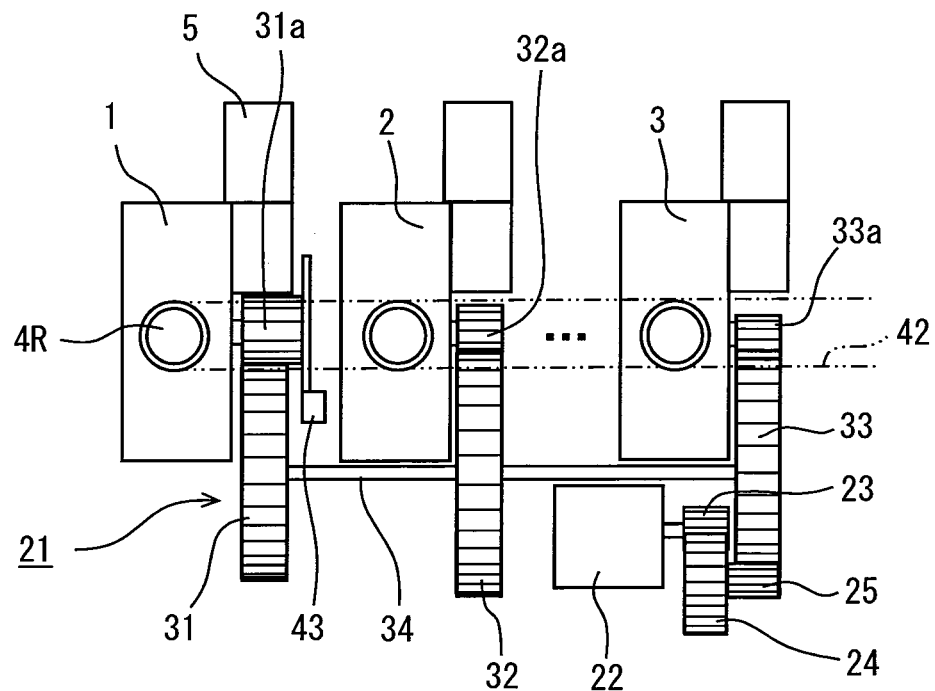
FIG. 4 is a schematic front diagram of the flow passage switching unit in the above-described embodiment.

In the first embodiment, three rotary valves 1 are apposed as shown in FIG. 4. The apposition direction is a horizontal direction in FIG. 4. The apposed respective rotary valves (rotary valve parts) 1, 2 and 3 respectively have a casing 6, space 7 in the casing 6, the first fluid ports 4L and 4R, the second fluid port 5, a valving element 8 and a rotary shaft 9 in FIG. 2.

The space 7 has side walls 11 and 12 which are formed inside the casing 6 and which are opposed, and a peripheral wall 13 formed between these side walls 11 and 12. The peripheral wall 13 has the first fluid ports 4L and 4R. In this embodiment, the first fluid ports 4L and 4R have the left-side piping (pipe) 4L and the right-side piping (pipe) 4R.

The side walls 11 and 12 have the second fluid port 5. Further, in the casing 6, the rotary shaft 9 extends in a direction connecting the opposed side walls 11 and 12, and the valving element 8 is rotatably supported with the rotary shaft 9.

Figure 2:
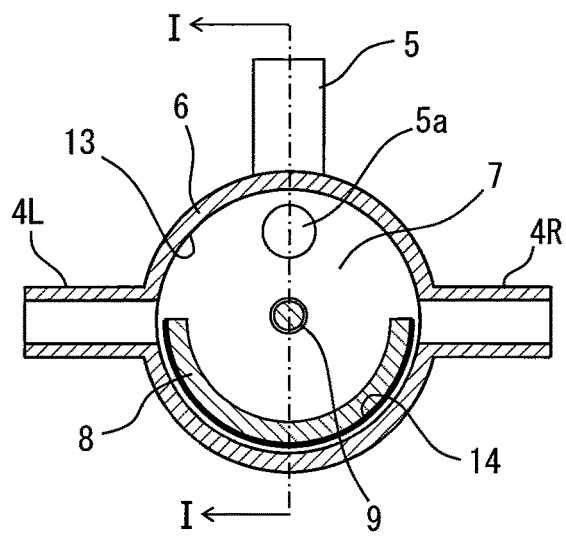
FIG. 2 is a partial longitudinal cross-sectional diagram of the rotary valve in the above-described embodiment along an arrow II-II line in FIG. 1.
Figure 3:
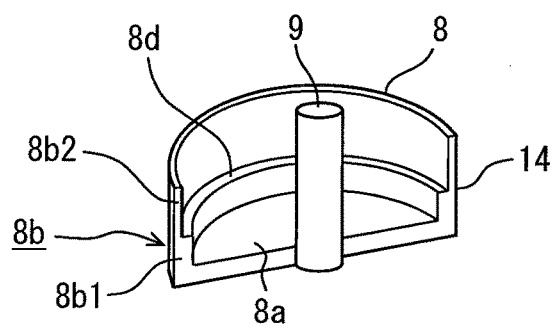
FIG. 3 is a perspective diagram of a valving element of the rotary valve in the above-described embodiment.

In FIG. 1 to FIG. 3, the valving element 8 has a fan plane member 8a which is connected to the rotary shaft 9 and which extends in a right angled direction with respect to the rotary shaft 9 and a circular plane member 8b which further extends in the right angled direction from the fan plane member 8a. The circular plane member 8b has a thick member 8b1 with a large thickness and a thin member 8b2 with a small thickness.

The thick member 8b1 is connected to the fan plane member 8a. The thin member 8b2 is connected to the thick member 8b1. In FIG. 2, a suction pipe 4L forming the left first piping 4L and a suction pipe 4R forming the right second piping 4R are provided in a straight line. A discharge pipe 5 forming the second fluid port 5 is projected in a vertical direction to the above-described straight line.

The space 7 has a cylindrical shape, and the left side piping 4L and the right side piping 4R, provided in the peripheral wall 13 in mutually different positions, communicate with the space 7. Further, in the side walls 11 and 12, the side wall 12 has the second fluid port 5. The valving element 8 has the above-described circular plane member 8b along an inner circumferential surface of the peripheral wall 13.

Even when the valving element 8 is in a position to work as a bridge between the left side piping 4L or the right side piping 4R and the second fluid port 5, and the valving element 8 blocks the flow of fluid via the left side piping 4L or the right side piping 4R, it is possible to pass the fluid flow through the second fluid port 5. Accordingly, in this embodiment, the peripheral wall 13 has the second fluid port 5.

Further, the circular plane members 8b1 and 8b2 have the thick member 8b1 and the thin member 8b2. With the thin member 8b2, an opening 5a of the second fluid port 5 in the peripheral wall 12 is prevented from being occluded regardless of the position of the valving element 8. Incidentally, when the thin member 8b2 does not exist but only the thick member 8b1 exists, a part of the thick member 8b1 might fills in a part of the opening 5a of the second fluid port 5.

With the rotation of the valving element 8, a fluid passage where the left side piping 4L and the right side piping 4R forming the first fluid ports 4L and 4R and the second fluid port 5 selectively communicate with each other is formed. Further, a driving mechanism 21 to repeatedly drive the respective valving elements 8 only by respectively predetermined rotation angles and stop them is provided as shown in FIG. 4.

The driving mechanism 21 has a motor forming a single driving source 22 and a motive power transmission member to transmit the rotation motive power of the single driving source 22 to the respective rotary valves 1, 2 and 3. The motive power transmission member is formed with combinations of plural gears 23, 24, 25, 31, 32, 33 and the like.

The motive power of the driving source 22 is transmitted to the respective rotary shafts 9 (FIG. 1) of the plural rotary valves 1, 2 and 3. The positions of the valving elements 8 with respect to the left side piping 4L and the right side piping 4R forming the first fluid ports 4L and 4R and the second fluid port 5 are mutually different among the respective rotary valves 1, 2 and 3. The respective valving elements 8 are driven.

In FIG. 3, the material of the valving element 8 is resin or the like. Further, the valving element 8 is formed in a stepped shape having a stepped member 8d shown in FIG. 3 so as to have a shape not to occlude the opening hole 5a (FIG. 2) connected to the discharge pipe 5 forming the second fluid port 5.

The valving element surface seal 14 (FIG. 2) is a part necessary to shut cooling water on the suction port side to stop the flow without leakage. It exists in a clearance between the casing 6 and the valving element 8. The rotating valving element 8 and the valving element surface seal 14 formed of a circular band are fixed by any means of adhesion, contact bonding, engagement and the like. As the material of the casing 6 to accommodate the valving element 8, synthetic resin material such as nylon, PPA or PPS is used. Note that when pressure-tight performance is required, metal (aluminum or SUS) is used.

The material of the valving element surface seal 14 formed of the circular band is preferably rubber material having durability against ethylene glycol, a rust-preventive agent, performance improver and the like blended in the cooling water. Accordingly, generally, EPDM or fluorocarbon rubber is used.

The valving element 8 has a structure where it is projected to the outside from the casing 6 as shown in FIG. 1 for connection with the gear train forming the driving mechanism 21. Accordingly, a seal structure to prevent leakage of the cooling water in the casing 6 to the outside is necessary. Generally, a cylinder seal 23 using an O ring (FIG. 1) is used.

In FIG. 4, the rotary valves 1, 2 and 3 have a first rotary valve 1, a second rotary valve 2 and a third rotary valve 3, and have a first body of rotation (first rotation body) 31 to drive the first rotary valve 1, a second body of rotation (second rotation body) 32 to drive the second rotary valve 2 and a third body of rotation (third rotation body) 33 to drive the third rotary valve 3. These first to third bodies of rotation 31 to 33 have gears as described above.

The second body of rotation 32 and the third body of rotation 33 are driven with a shaft (common shaft) 34 of the first body of rotation 31. The respective valving elements 8 of the first rotary valve 1, the second rotary valve 2 and the third rotary valve 3, connected to the first to third bodies of rotation 31 to 33 via input pinions 31a, 32a and 33a, rotate by respectively predetermined rotation angles and stop.

Then the predetermined rotation angles are set such that the rotation angles of the valving elements 8 in at least a pair of rotary valves are mutually different. For example, the rotation angles of the respective valving elements 8 of a pair of rotary valves 1 and 2 are mutually different. Note that in this embodiment, the rotation angles of the respective valving elements 8 in all the pairs of the rotary valves 1, 2 and 3 are mutually different.

Figure 5:
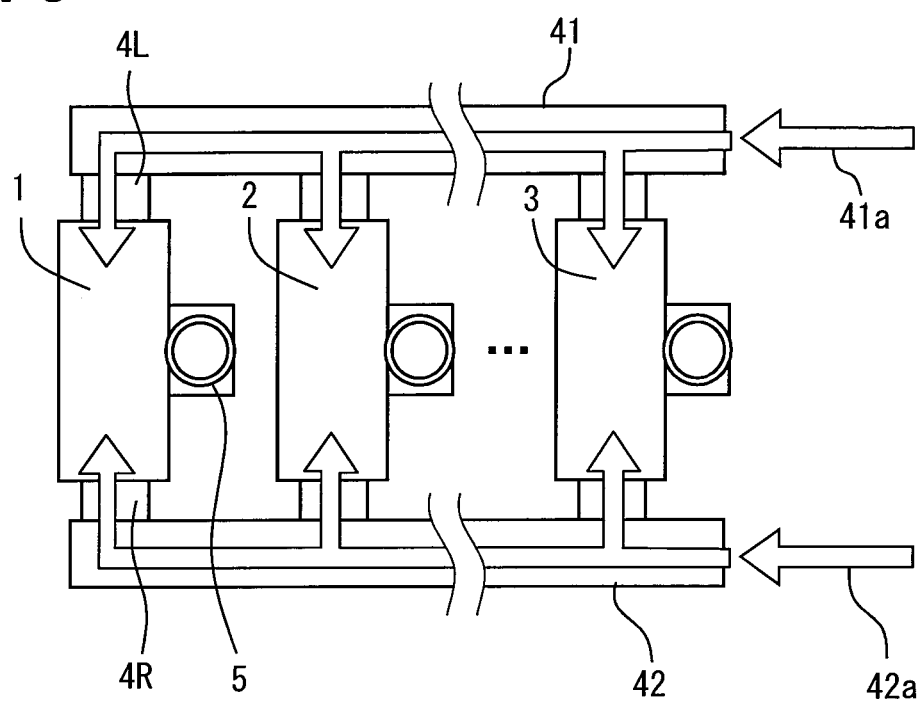
FIG. 5 is a schematic plane diagram of the flow passage switching unit in the above-described embodiment.

As shown in FIG. 5, the left side piping 4L and the right side piping 4R which are the respective first fluid port of the plural rotary valves 1, 2 and 3 are respectively connected to the common fluid pipings (pipes) 41 and 42. In this embodiment, the common fluid pipings 41 and 42 have a first common fluid piping (pipe) 41 and a second common fluid piping (pipe) 42. The plural rotary valves 1, 2 and 3 are mechanically connected to the first common fluid piping 41 and the second common fluid piping 42.

The driving source 22 rotates the common shaft 34 which extends in parallel with the apposition direction of the rotary valves 1, 2 and 3. Then the respective rotary valves 1, 2 and 3 are driven via the common shaft 34. As shown in FIG. 4, the driving source 22 is provided between the second body of rotation 32 and the third body of rotation 33, however, it may be provided among other bodies of rotation.

As described above, in this embodiment, the rotation angles of the valving elements 8 of the respective rotary valves 1, 2 and 3 ... (N) are all different. Assuming that the rotation angle of the first rotary valve 1 is 1, the rotation angle ratio of the (N) rotary valves has relation of 1 to 2 to 4 to ... to 2 to the (N−1)th power.

As shown in FIG. 4, an input pinion 31a connected to the rotary shaft 9 of the first rotary valve 1 driven with a gear forming the first body of rotation 31 is provided with a rotation angle detection device (potentiometer) 43. The rotation angle detection device 43 detects the rotation position of the rotary shaft 9 of the first rotary valve 1. Regarding a motor 22 forming the driving source 22, it is sufficient to perform only rotation in a forward direction, however, in the first embodiment, for improvement in rotary valve switching speed, a forward/reverse directional rotation (reversible rotation) function is added.

As the motor 22, a low-price direct-current motor is used. A reduction gear 24 engaged with an output pinion 23 connected to an output shaft of the motor 22 is, in consideration of shortage of torque of the motor 22, used for obtaining larger rotational driving power (torque) to the valving element.

A center gear 31 forming the first body of rotation 31 is fixed to the common shaft (center shaft) 34 and is engaged with the input pinion 31a as a valving element gear. Assuming that the rotation angle of the first rotary valve 1 is 1, the rotation angle ratio of the (N) rotary valves has relation of 1 to 2 to 4 to ... to 2 to the (N−1)th power as described above.

The gear ratio between the first body of rotation 31 and the input pinion 31a is designed such that, in the first rotary valve 1, the second rotary valve 2 and the third rotary valve 3, the above-described rotation angle ratio is 1 to 2 to ... 2 to the (N−1)th power respectively. As the material of the first to third bodies of rotation 31 to 33 and the input pinions 31a, 32a and 33a forming the valving element gear, synthetic resin or the like may be used.

The input pinions 31a, 32a and 33a forming the respective valving element gears and the internal valving elements 8 are connected to each other and integrally rotated. The integration by connection is made by any of adhesion, welding, press fitting, integral moulding and the like. The common shaft 34 is a part to coaxially connect the plural first to third bodies of rotation 31 to 33. The material of the common shaft 34 is SUS material or the like. A bearing or the like to hold the common shaft 34 is attached to an outer casing 51 (FIG. 6).

In the rotation angle detection device 43 in FIG. 4, by regularly providing a potentiometer to detect the rotation angle by electrical resistance and a magnetic body, and reading the arrangement pattern of the magnetic bodies with a Hall device, the current rotation angle of the input pinion 31a, i.e., the rotation angle of the valving element 8 is detected. As a detectable angle of the rotation angle detection device 43, a range of at least 360 degrees is required. It goes without saying that it is necessary for the valving element 8 and the rotation angle detection device 43 in the first rotary valve 1 to move integrally.

As shown in FIG. 5, the first fluid ports 4L and 4R have the left side piping 4L and the right side piping 4R communicating with the inside of the casing in mutually different positions. As shown in FIG. 5, the common fluid pipings 41 and 42 have the first common fluid piping 41 and the second common fluid piping 42 through which different types of fluid (warm water and cool water) 41a and 42a flow respectively. Then the plural rotary valves 1, 2 and 3 between the first common fluid piping 41 and the second common fluid piping 42 are connected via the first common fluid piping 41 and the second common fluid piping 42.

Figure 6:
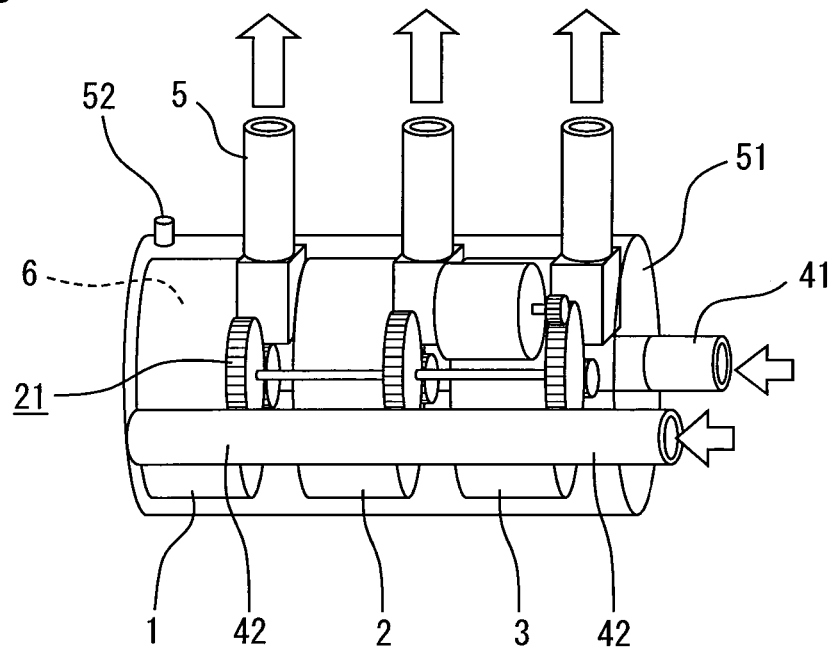
FIG. 6 is an internally transparent perspective diagram of the flow passage switching unit in the above-described embodiment.

As shown in FIG. 6, the rotary valve having the three rotary valves 1, 2 and 3 and the driving mechanism 21 are included in the tank-shaped outer casing 51. The inside of the outer casing 51 communicates with the outside air via a ventilation hole 52. A part of the common fluid pipings 41 and 42 is formed through the outer casing 51. The ventilation hole 52 maintains proper pressure in the outer casing 51. In the case of watery environment, a cap (filter) having fluororesin porous membrane is put on the ventilation hole 52 in some cases.

The outer casing 51 stores the gears of the driving mechanism 21 and the motor. The outer casing 51 may be integrally molded with any one of the left side piping 4L, the right side piping 4R, the discharge pipe 5 and the casing 6 of the rotary valve, the first common fluid piping 41 and the second common fluid piping 42. The material of the outer casing 51 is equivalent to that of the casing 6.

Figure 7:
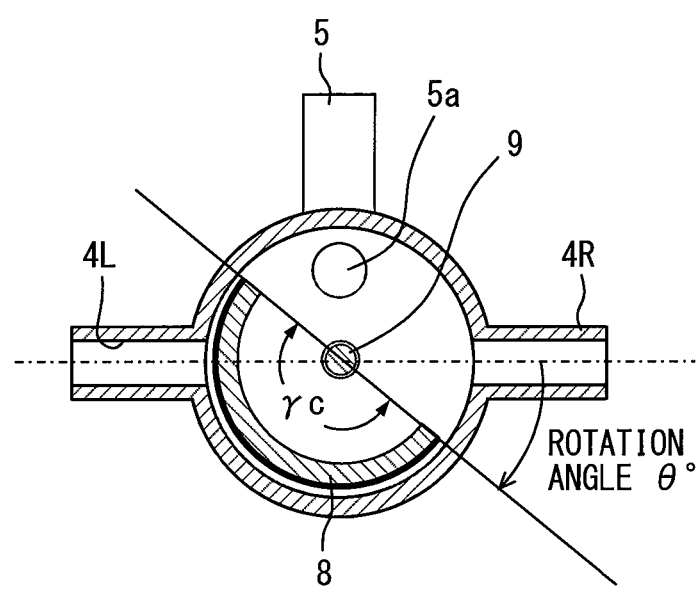
FIG. 7 is an internal structural diagram in which a left side piping forming a first fluid port of the rotary valve in the above-described embodiment is occluded.

FIG. 7 illustrates an internal structure in which in the valving element 8 of any one of the rotary valves 1, 2 and 3 in the first embodiment, the left side piping 4L in the first fluid port is occluded. In FIG. 7, the rotation angle □ indicates a rotation angle from an initial position. Further, a valving element close angle γc as an angle of divergence of the valving element is 180 degrees in FIG. 7. The suction/discharge relation can be inversed, however, in this embodiment, a first piping (left side piping 4L) and a second piping (right side piping 4R) forming the first fluid port form a suction unit. Further, the second fluid port 5 forms a discharge unit.

Figure 8:
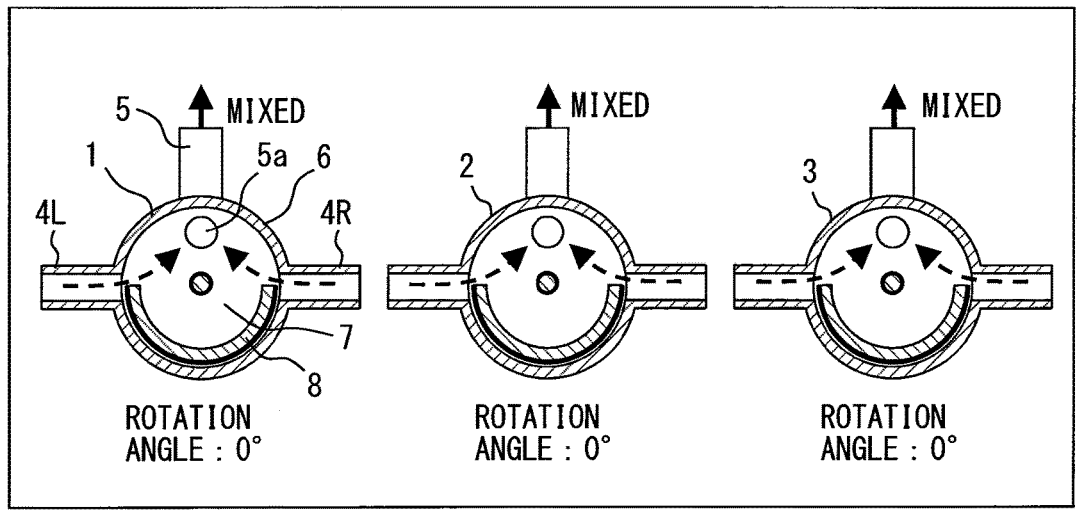
FIG. 8 is an internal structural diagram of the plural rotary valves, showing an operation pattern when all the rotation angles in the above-described embodiment are 0 degrees.
Figure 9:
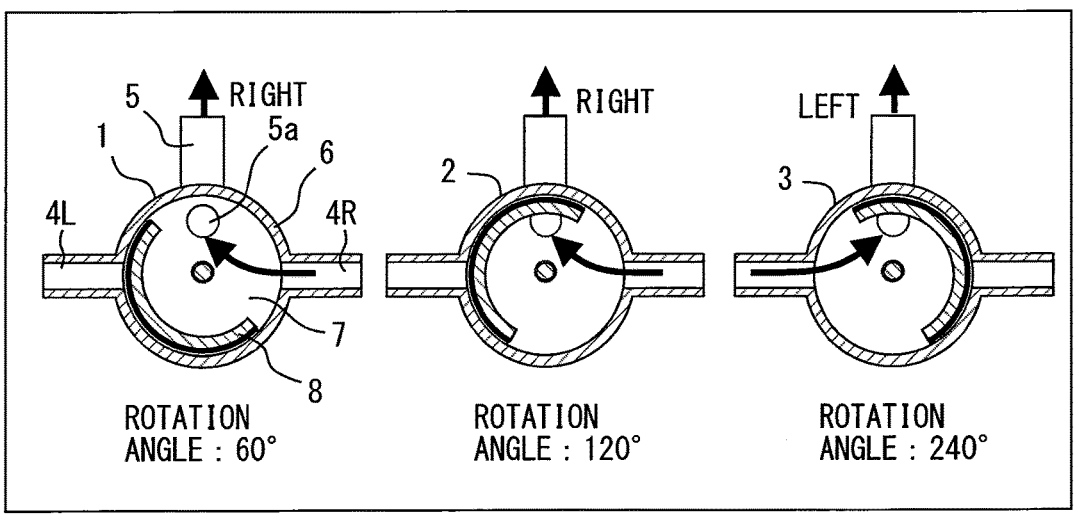
FIG. 9 is an internal structural diagram of the plural rotary valves showing an operation pattern when the rotation angles in the above-described embodiment are 60 degrees, 120 degrees and 240 degrees.
Figure 10:
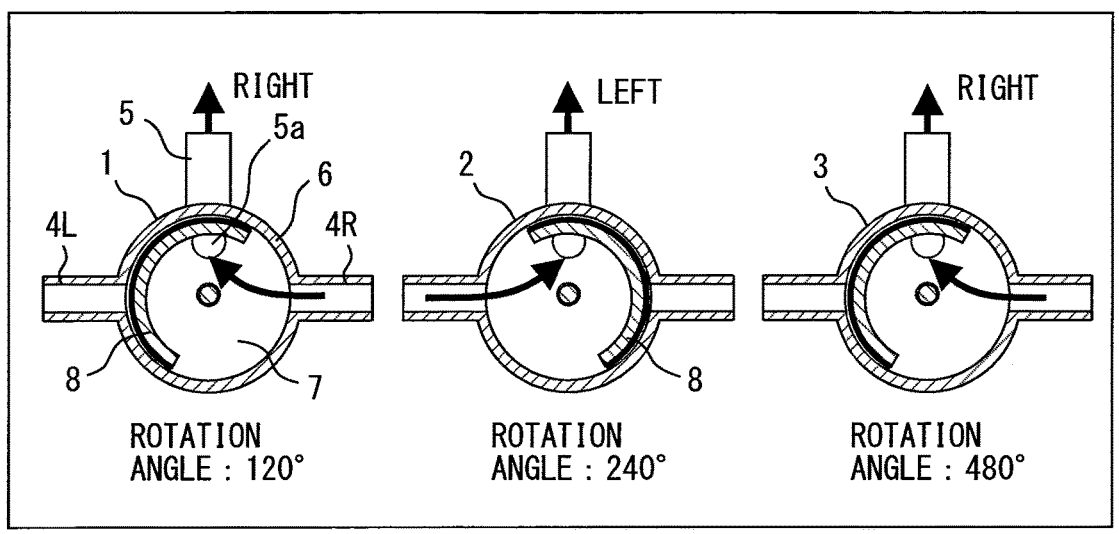
FIG. 10 is an internal structural diagram of the plural rotary valves showing an operation pattern when the rotation angles in the above-describe embodiment are 120 degrees, 240 degrees and 480 degrees.

The rotation angle ratio among the plural valving elements 8 is 1 to 2 to the (n−1)th power (n is an arbitrary natural number not including 0) as shown in FIG. 8 to FIG. 10. For example, the respective valving elements 8 start from the status in FIG. 8, rotate by double-up rotation angles such as rotation angles of 60 degrees, 120 degrees, 240 degrees in FIG. 9 and 120 degrees, 240 degrees and 480 degrees in FIG. 10, and stop.

FIG. 8 shows an internal structure of the plural rotary valves 1, 2 and 3 showing the initial position operation pattern when the rotation angles in the above-described embodiment are all 0 degrees. In the operation pattern example in the structure with the three rotary valves 1, 2 and 3 in this case, sequentially, the rotation angle of 0 degrees, the rotation angle of 0 degrees and the rotation angle of 0 degrees are shown. The discharged fluid is "mixed" ("MIXED" in FIG. 8), "mixed", and "mixed".

In FIG. 8, in any of the rotary valves 1, 2 and 3, the fluid flows in the casing 6 from both of the left side piping 4L and the right side piping 4R, and flows out from the discharge piping 5 as the second fluid port 5. Accordingly, this is a mix mode (mixing) of fluids from two systems of warm water and cool water.

FIG. 9 shows an internal structure of the plural rotary valves 1, 2 and 3 showing the operation pattern when the rotation angles in the first embodiment are 60 degrees, 120 degrees and 240 degrees. In the operation pattern example in the structure with the three rotary valves 1, 2 and 3 in this case, the rotation angles are sequentially the rotation angle of 60 degrees, the rotation angle of 120 degrees and the rotation angle of 240 degrees. The discharged fluid is "right", "right" and "left".

FIG. 10 shows the inside of the plural rotary valves 1, 2 and 3 showing the operation pattern when the rotation angles in the first embodiment are 120 degrees, 240 degrees and 480 degrees. The fluid discharged from the three rotary valves 1, 2 and 3 in this case is "right", "left" and "right". That is, in FIG. 10, the first rotary valve 1 discharges the fluid flowed from the right side piping 4R, the second rotary valve 2 discharges the fluid flowed from the left side piping 4L, and the third rotary valve 3 discharges the fluid flowed from the right side piping 4R.

Figure 11:
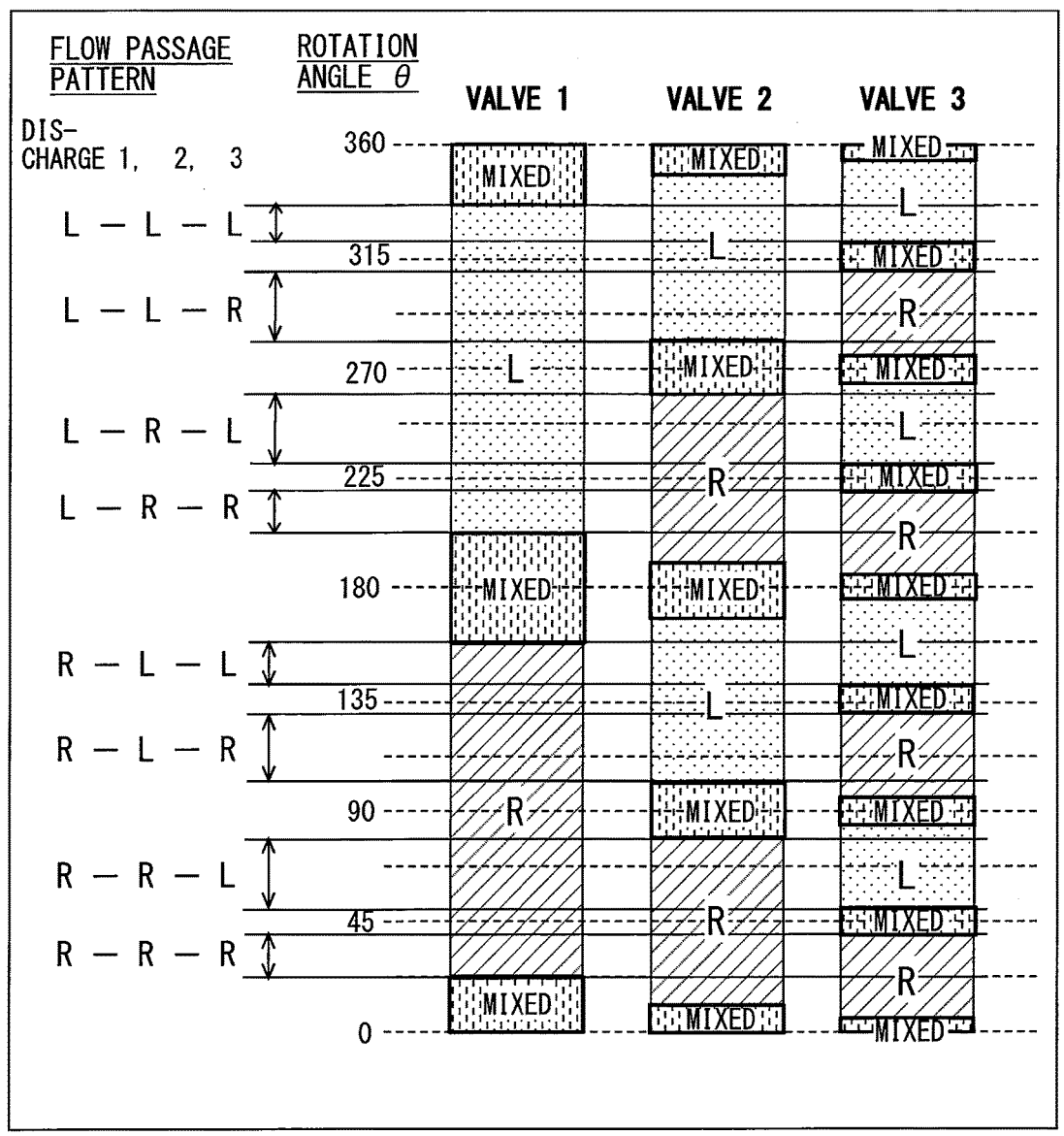
FIG. 11 is a table showing operations of the respective rotary valves in eight flow passage patterns in the above-described embodiment.

FIG. 11 shows operations of the respective rotary valves 1, 2 and 3 in eight flow passage patterns in the first embodiment. The first rotary valve 1 to the third rotary valve 3 are abbreviated to valve 1 to valve 3. In the column of the flow passage pattern, "L" indicates a status where the fluid flowed from the left side piping 4L is discharged. Further, "R" indicates a status where the fluid flowed from the right side piping 4R is discharged. "MIXED" means the mix mode, in which the fluid flows in the casing 6 from both of the left side piping 4L and the right side piping 4R and flows out from the discharge piping as the second fluid port 5, is abbreviated.

In the first embodiment, in the rotating valving element 8, the left side piping 4L has a suction pipe, and the right side piping 4R also has a suction pipe. It has a function of guiding only one of the cooling water to flow from the suction pipe into the casing 6 to the discharge pipes forming the second fluid port 5.

Figure 12:
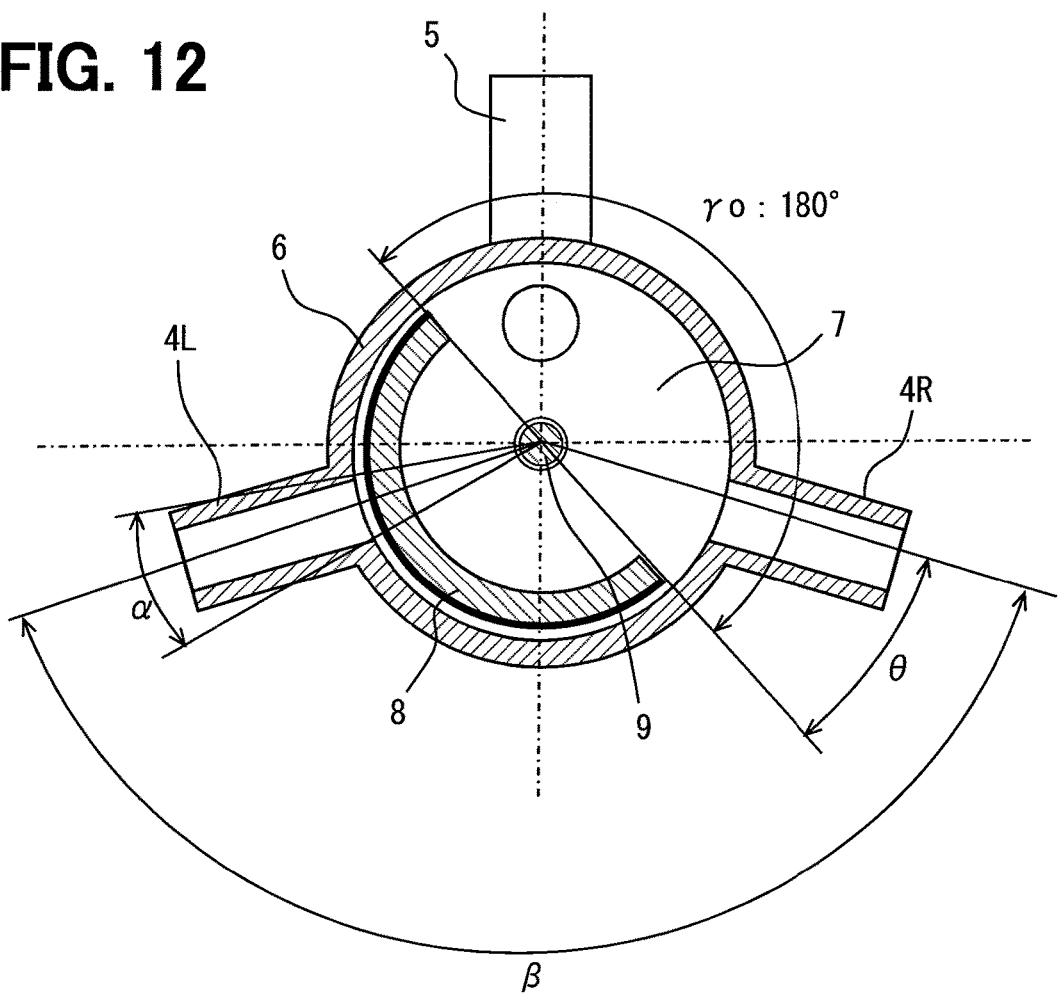
FIG. 12 is an internal structural diagram of the rotary valve in a second embodiment.

With reference to FIG. 12 to be described later, the valving element 8 (FIG. 7) in the first embodiment has a circular arc shape. As shown in FIG. 12, the angle spreading from the rotary shaft 9 as a center between both end surfaces on the casing inner side, corresponding to the hole diameter of the first fluid ports 4L and 4R, is a port hole diameter angle α (suction port opening angle). The angle spreading from the rotary shaft 9 as a center between the left side piping 4L and the right side piping 4R is a port alienation (separation) angle β (suction pipe arrangement angle). The angle equal to or smaller than 180 degrees from the rotary shaft 9 as a center between the both ends of the valving element 8 is a valving element close angle γc. When 360 degrees −γc is a valving element open angle γo, in the rotary valves 1, 2 and 3 in the first embodiment, the port hole diameter angle α is 45 degrees, the port alienation angle β is 180 degrees, the valving element close angle γc is 180 degrees, and the valving element open angle γo is 180 degrees.

By setting the port alienation angle β to 180 degrees, within the apposition number N of the rotary valves 1, 2 and 3, limited with a value of the port hole diameter angle α, flow passage switching is possible in 2 to the Nth power patterns. In other settings, addition of a shut function to be described later and flow regulation to be described later are possible, however, the number of patterns is smaller than 2 to the Nth power in some cases.

The rotary valves 1, 2 and 3 in the first embodiment generally have the inner shape shown in FIG. 7. The port hole diameter angle α is 45 degrees; the port alienation angle β, 180 degrees; the valving element close angle γc, 180 degrees; and the valving element open angle γo, 180 degrees. Under this condition, the number of the rotary valves 1, 2 and 3 to realize the flow passage switching in the 2 to the Nth power patterns is limited.

As shown in FIG. 11, in the respective regions where the rotation angle of the valving element is (0 degrees to α/2 degrees), (180−α/2) degrees to (180+α/2) degrees, and (360−α/2) degrees to 360 degrees, the mode is a mix region operation mode in which the fluids from the left and right suction pipings 4L and 4R are mixed and flow to the discharge piping 5.

When a mix region to enter the mix region operation mode exists in any one of the rotary valves 1, 2 and 3, arbitrary flow passage distribution cannot be performed. Accordingly, when a flow passage pattern is to be realized, it is necessary to form a flow passage pattern at rotation angle(s) such that no mix region exists in the operation patterns of all the rotary valves 1, 2 and 3.

In FIG. 11, in the region where the rotation angle of the first rotary valve 1 is (0 to α/2) degrees, when the operation region overlaps a region where the rotation angle of the N-th rotary valve is (180−α/2) degrees to (180)+α/2) degrees, it is impossible to perform flow passage switching in the 2 to the Nth power patterns.

As described above, as the limitation (conditions) when the flow passage switching in the 2 to the Nth power patterns with N valves is to be realized, assuming that the suction port opening angle is a degrees, the N and a angle values must satisfy the following expression 1.

$$N \leq (180/\alpha) - 1 \qquad \text{(Expression 1)}$$

Note that N is the number of apposed rotary valves 1, 2 and 3, and α, the port hole diameter angle. Note that when the flow passage switching in the 2 to the Nth power patterns is satisfied, it is not necessary to satisfy the above relational expression.

In the case of a cooling circuitry where cooling water from two systems, e.g. a warm water system and a cold water system, is selectively distributed to two or more passages, the group of three-way valve type rotary valves 1, 2 and 3 to perform "2 input 1 out" type flow passage switching is apposed in correspondence with the number of passages to be subjected to distribution. Then, it is possible to independently control the respective groups of the rotary valves 1, 2 and 3.

When the number of outputs (discharge ports) is N, it is possible to perform the flow passage switching in the 2 to the Nth power patterns by independently controlling the respective rotary valves 1, 2 and 3. Note that as a flow passage switching pattern, since there are two flow passage patterns for any one of the rotary valves 1, 2 and 3, when the N patterns independently exist, there are 2 to the Nth power flow passage patterns.

In the first embodiment, the N "2 inputs 1 output" type three-way valve type rotary valves 1, 2 and 3 are connected, and the rotation of the single driving source 22 is transmitted with the driving mechanism 21 having a gear mechanism to the respective rotary valves 1, 2 and 3. With this arrangement, the flow passage switching in the maximum 2 to the Nth power patterns is realized.

In this case, the respective rotary valves 1, 2 and 3 have the valving element 8 at the valving element close angle γc of 180° inside. The flow passage pattern is switched by rotation of the valving element 8. Then, to change the rotation angle of the internal valving element 8 by each of the rotary valves 1, 2 and 3, the speed ratio (or gear ratio) among the respective bodies of rotation 31, 32 and 33 and the input pinions 31a, 32a and 33a is changed. Note that the speed ratio U is represented as a result of division of the number of gears of the driving gears (31, 32 and 33 in FIG. 4) by the number of gears of the driven gears (31a, 32a and 33a in FIG. 4), or a result of division of the angular speed of the driven gears by the angular speed of the driving gears.

A case where two of the rotary valves 1, 2 and 3 exist (for example, 1 and 2) will be studied. In this case, as a flow passage pattern, when the flow passage pattern for the first rotary valve 1 is "left", as the flow passage pattern for the second rotary valve 2, two patterns, "right" and "left" are possible patterns. Similarly, when the flow passage pattern for the first rotary valve 1 is "right", as the flow passage pattern for the second rotary valve 2, two patterns, "right" and "left" are possible patterns.

In this manner, subsequently to one first flow passage pattern, two second "right" and "left" flow passage patterns are conceivable. Similarly, subsequently to second one flow passage pattern, two third "right" and "left" patters are conceivable. In this relation, when the number of valves is incremented by one, the total number of flow passage patterns becomes the square. With any one of the first rotary valves 1, 2 and 3 having two patterns as a reference, the number of flow passage patterns when the number of values is increased to the number of Nth rotary valve is 2 to the Nth power patterns.

Here, a case when the pattern for the first rotary valve 1 is "right", and the "right" and "left" are to be changed in the patterns for the second rotary valve 2 will be studied. Since the valve structure is a rotary valve, the valve rotation angle range when the pattern for the first rotary valve 1 is "right" is limited to a range obtained by subtracting the port hole diameter angle (suction port opening angle) α from 180°.

While the valving element rotation angle of the first rotary valve 1 is within the "right" operation angle, it may be rotated such that the second valve patterns are "right" and "left". Then, the two rotary valves 1 and 2 may be connected such that the rotation angle of the second rotary valve 2 is double of the rotation angle of the first rotary valve 1.

With this connection, when the first rotary valve 1 is within the range of "right", the second rotary valve 2 covers the "right" and "left" operation angles. In the case of this idea, the rotation angle ratio as a ratio between the rotation angle of some rotary valve A and the rotation angle of its adjacent rotary valve A+1 is doubled. With this arrangement, it is possible to cover the flow passages in the 2 to the Nth power patterns while the first rotary valve is rotated 360°.

Note that since the "flow passage mix" region determined based on the values of the port hole diameter angle (suction port opening angle) a and the valving element open angle γo exists, the number of rotary valves 1, 2 and 3 is limited.

As described above, the rotation angle ratio among the valving elements 8 of the first rotary valve 1, the second rotary valve 2 . . . the Nth rotary valve N is set as 1:2: . . . 2 to the (N−1)th power. With this arrangement, it is possible to obtain the flow passage switching unit to realize the 2 to the Nth power patterns of flow passages while the first rotary valve 1 rotates 360°.

The effects of the first embodiment will be described. Here the effects of the first embodiment are summarized as follows. The respective first fluid ports 4L and 4R of the plural rotary valves 1, 2 and 3 are connected to the common fluid pipings 41 and 42. Further, the plural rotary valves 1, 2 and 3 are mechanically connected to the common fluid pipings 41 and 42. According to this arrangement, the plural rotary valves are respectively connected to the common fluid piping, accordingly, it is possible to enhance the connection strength of the plural rotary valves with the common fluid piping.

Further, the plural valving elements 8 connected to the driving mechanism 21 repeat rotating by respectively-predetermined rotation angles and stopping, and at least a pair of valving elements 8 rotate by mutually different rotation angles and stop. According to this arrangement, it is possible to appose plural rotary valves and perform flow passage switching in a large number of patterns.

Further, since all the valving elements 8 rotate by mutually different rotation angles then stop and the rotation angle ratio among the valving elements 8 is 1 to $2^{n-1}$ (n is an arbitrary natural number not including 0), it is possible to appose N rotary valves and perform flow passage switching in 2 to the Nth power patterns. With this arrangement, for example, the respective valving elements rotate double-double rotation angles such as 60 degrees, 120 degrees and 240 degrees and stop.

Next, the first fluid ports 4L and 4R have the left side piping 4L and the right side piping 4R communicating with the inside of the casing 6 in mutually different positions. The common fluid pipings 41 and 42 have the first common fluid piping 41 and the second common fluid piping 42 through which different types of fluids flow. Then the plural rotary valves 1, 2 and 3 between the first common fluid piping 41 and the second common fluid piping 42 are connected via the first common fluid piping 41 and the second common fluid piping 42. According to this arrangement, as the plural rotary valves have three-way valves, and are connected between and via the first common fluid piping and the second common fluid piping, it is possible to further enhance the connection strength of the plural rotary valves.

Further, the driving source 22 rotates the common shaft 34 extending in parallel with the apposition direction of the rotary valves 1, 2 and 3. Then, as the respective rotary valves 1, 2 and 3 are driven via the common shaft 34, it is possible to attain the flow passage switching unit where the plural rotary valves 1, 2 and 3 are driven with the single driving source 22.

Further, the plural rotary valves 1, 2 and 3 have the first rotary valve 1, the second rotary valve 2 and the third rotary valve 3. The driving mechanism 21 has the first body of rotation 31 to drive the first rotary valve 1, the second body of rotation 32 to drive the second rotary valve 2, and the third body of rotation 33 to drive the third rotary valve 3. Then the second body of rotation 32 and the third body of rotation 33 are driven with the common shaft 34 as a shaft of the first body of rotation 31. Further, the respective valving elements 8 of the first rotary valve 1, the second rotary valve 2 and the third rotary valve 3 are connected to the first body of rotation 31, the second body of rotation 32 and the third body of rotation 33. According to this arrangement, it is possible to drive the common shaft as a rotation axis of the first body of rotation with the single driving source, and to drive the respective valving elements of the three rotary valves with the interlocked second body of rotation and the third body of rotation.

Further, the driving source 22 is provided between any body of rotation of the first body of rotation 31, the second body of rotation 32 and the third body of rotation 33. According to this arrangement, the driving source is provided between any body of rotation of the first to third bodies of rotation, and it is possible to attain a flow passage switching unit in which the length of the rotary valves in the apposition direction is comparatively short.

Second Embodiment

Next, a second embodiment will be described. Note that in the following respective embodiments, constituent elements identical to those in the above-described first embodiment have the same reference numerals and the explanations will be omitted. The different constituent elements and characteristic features will be described.

First, the conditions of the three-way valve to set a shut mode and a flow regulation mode will be described. In FIG. 12, the valving element 8 has a circular shape, and the angle spreading from the rotary shaft 9 as a center between the both end surfaces on the casing 7 inner side corresponding to the hole diameter of the first fluid port is defined as a port hole diameter angle α (suction port opening angle). The port hole diameter angle α is set within the range from 20 degrees to 45 degrees, however, in this embodiment, the angle α is 45 degrees. Note that FIG. 12 is a schematic diagram not corresponding to the actual angle.

Next, the angle spreading from the rotary shaft 9 as a center between the left side piping 4L and the right side piping 4R is defined as a port alienation angle β (suction pipe arrangement angle). Further, the angle equal to or smaller than 180 degrees spreading from the rotary shaft 9 as a center between the both ends of the valving element 8 is defined as a valving element close angle γc (=360 degrees−γo). Then as it is found from FIG. 12, the port alienation angle β (suction pipe arrangement angle) is smaller than 180 degrees. Further, the valving element close angle γc and the valving element open angle γo are both 180 degrees.

Figure 13:
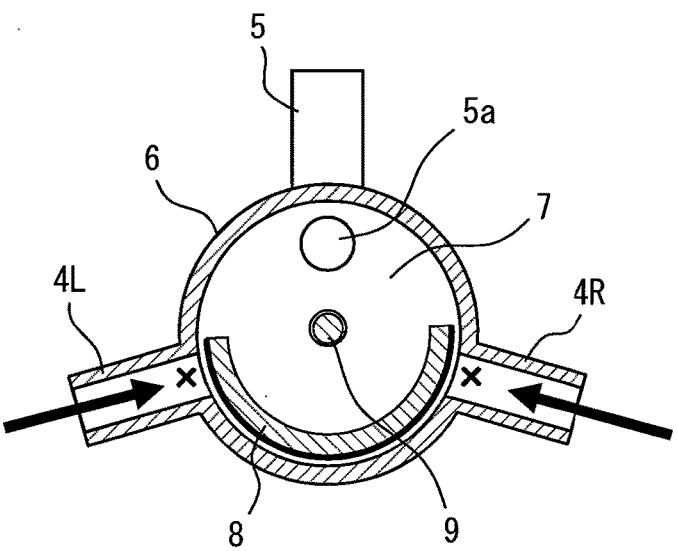
FIG. 13 is an internal structural diagram showing a shut mode to prevent flow of fluid, in the left side piping and right side piping forming the first fluid port, into a casing, in the rotary valve in the above-described second embodiment.

FIG. 13 shows the status of the shut mode. The shut mode is a mode to prevent the fluids in both of the right side piping 4R and the left side piping 4L forming the first port from flowing through the casing 7, by extension, through the second fluid port 5. Further, the flow regulation mode is a mode in which the extent of communication between the left side piping 4L or the right side piping 4R with the inside of the casing 7 can be regulated. Then, the conditions of the three-way valve to set the shut mode and the flow regulation mode are as follows.

The valving element 8 has a circular shape. The angle spreading from the rotary shaft 9 as a center between the both end surfaces on the casing 7 inner side, corresponding to the hole diameter of the first fluid ports 4L and 4R, is the port hole diameter angle α. The port alienation angle β spreads from the rotary shaft 9 as a center between the left side piping 4L and the right side piping 4R. The angle equal to or smaller than 180 degrees spreading from the rotary shaft 9 as a center between the both ends of the valving element 8 is the valving element close angle γc. The "360 degrees−γc" is the valving element open angle γo.

In the relation among these angles, the port alienation angle β is "equal to or larger than the port hole diameter angle α and equal to or smaller than 180 degrees". Further, the valving element close angle γc is "equal to or smaller than 360 degrees-port hole diameter angle α". When γo≥α+β holds as the relation among the port hole diameter angle α, the port alienation angle β and the valving element open angle γo, the function of the shut mode and the flow regulation mode can be set.

Third Embodiment

Figure 14:
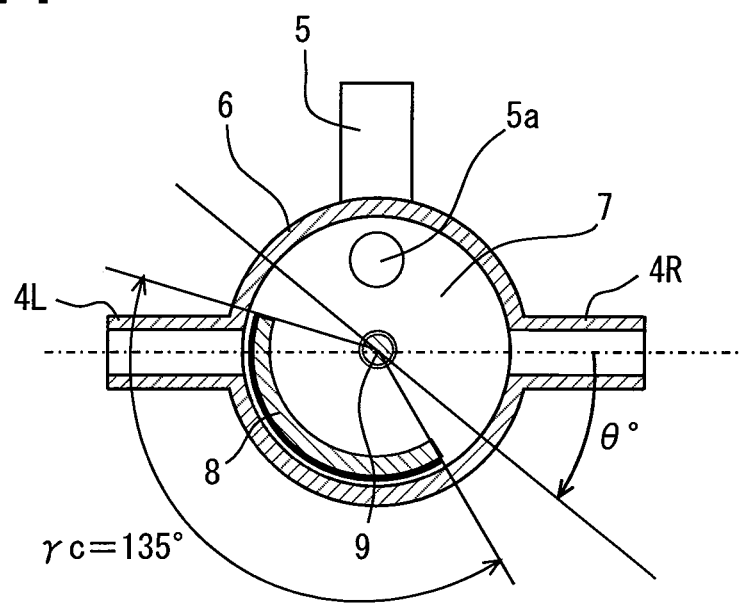
FIG. 14 is an internal structural diagram of the rotary valve in a third embodiment.

Next, a third embodiment will be described. The characteristic features different from those in the above-described embodiments will be described. FIG. 14 shows an internal structure of the rotary valve in the third embodiment. The valving element close angle (valving element occlusion angle) γc in the third embodiment is 135 degrees smaller than 180 degrees. Further, the port hole diameter angle (suction port opening angle) α is 45 degrees, and the port alienation angle (suction pipe arrangement angle) β is 180 degrees.

Figure 15:
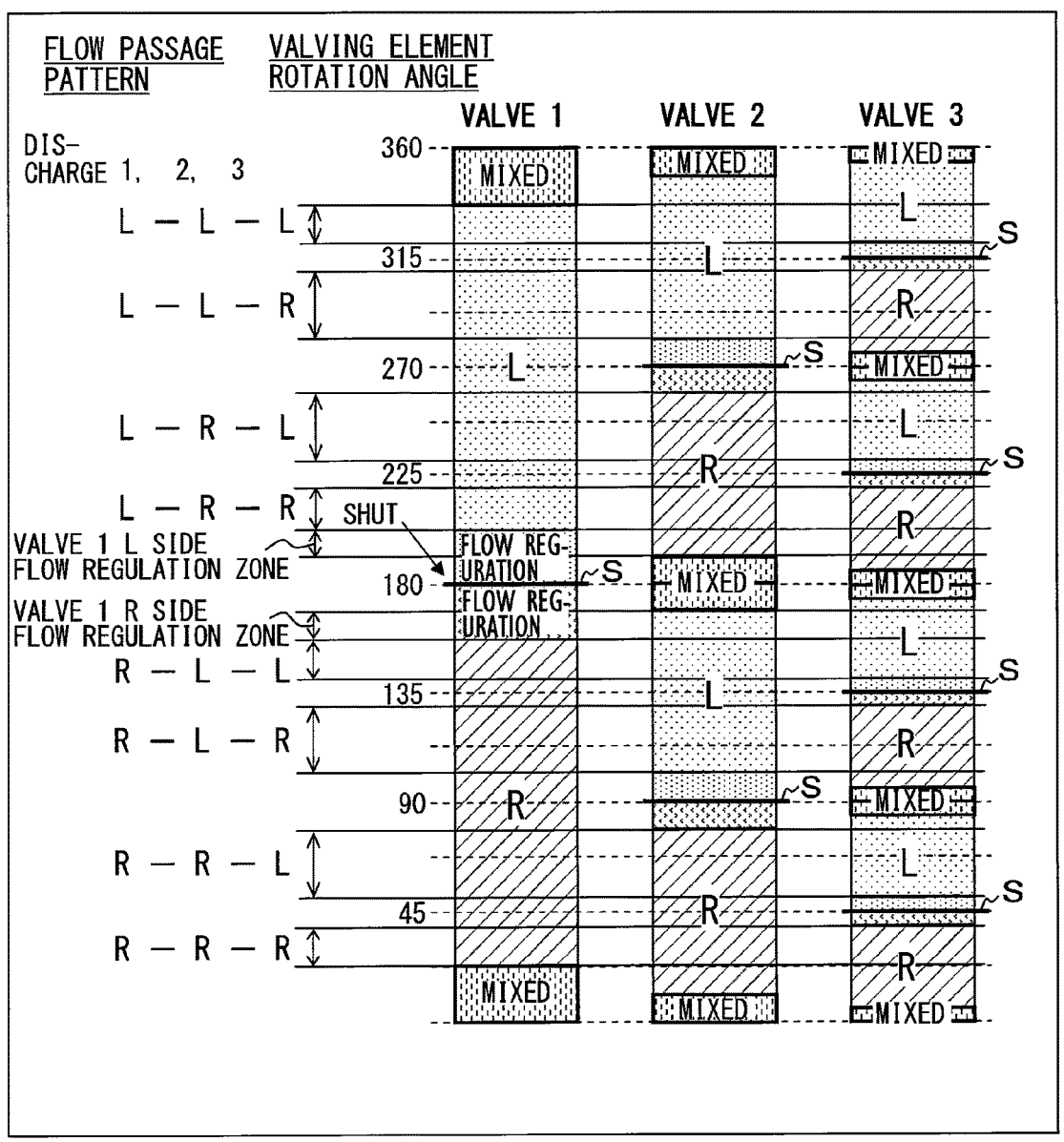
FIG. 15 is a table showing operations of the respective rotary valves in the eight flow passage patterns in the above-described third embodiment.

FIG. 15 shows operations of the respective rotary valves in the eight flow passage patterns in the third embodiment. In FIG. 15, the first rotary valve 1 to the third rotary valve 3 are abbreviated to valve 1 to valve 3. In the column of the flow passage pattern, "L" indicates a status where the fluid flowed from the left side piping 4L is discharged. Further, "R" indicates a status where the fluid flowed from the right side piping 4R is discharged. "MIXED" means the mix mode, in which the fluid flows in the casing 7 from both of the left side piping 4L and the right side piping 4R and flows out from the discharge piping as the second fluid port 5, is abbreviated. The "flow regulation" is the flow regulation mode. Further, "S" or "shut" indicates the shut mode.

In this manner, in this third embodiment, the port alienation angle β is "equal to or larger than the port hole diameter angle α and equal to or smaller than 180 degrees". Further, the valving element close angle γc is "equal to or smaller than 360 degrees-port hole diameter angle α". As the relation among the port hole diameter angle α, the port alienation angle β and the valving element open angle γo "γo≥α+β", 225 degrees≥45+180 holds, and the relation is established.

Since the relation "γc≥β+α" is established, even in the third embodiment in FIG. 14 and FIG. 15, the following functions are obtained. That is, the function of the shut mode to prevent the fluid in both of the right side piping 4R and the left side piping 4L forming the first port from flowing in the casing 7, by extension, through the second fluid port 5, and the function of the flow regulation mode, can be set.

Fourth Embodiment

Figure 16:
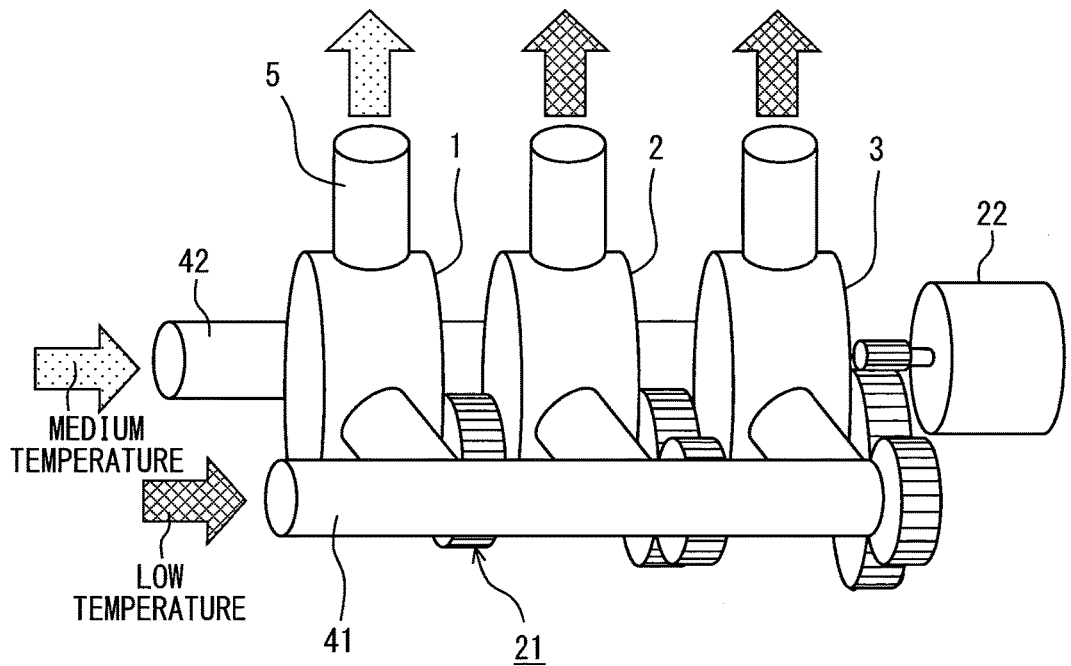
FIG. 16 is a schematic perspective diagram of the flow passage switching unit in a fourth embodiment.

Next, a fourth embodiment will be described. The characteristic features different from those in the above-described embodiments will be described. FIG. 16 is a schematic perspective diagram of the flow passage switching unit in the fourth embodiment. This flow passage switching unit has a 2-in 3-out valve.

In FIG. 16, it is possible to arbitrarily distribute cooling water from two systems at intermediate-temperature and low-temperature in three directions. The motor forming the single driving source 22 is provided outside the rotary valves 1, 2 and 3. The motor 22 rotates only as forward direction rotation. Three rotary valves 1, 2 and 3 and unshown one potentiometer are provided. The driving mechanism 21 has a gear train.

Fifth Embodiment

Figure 17:
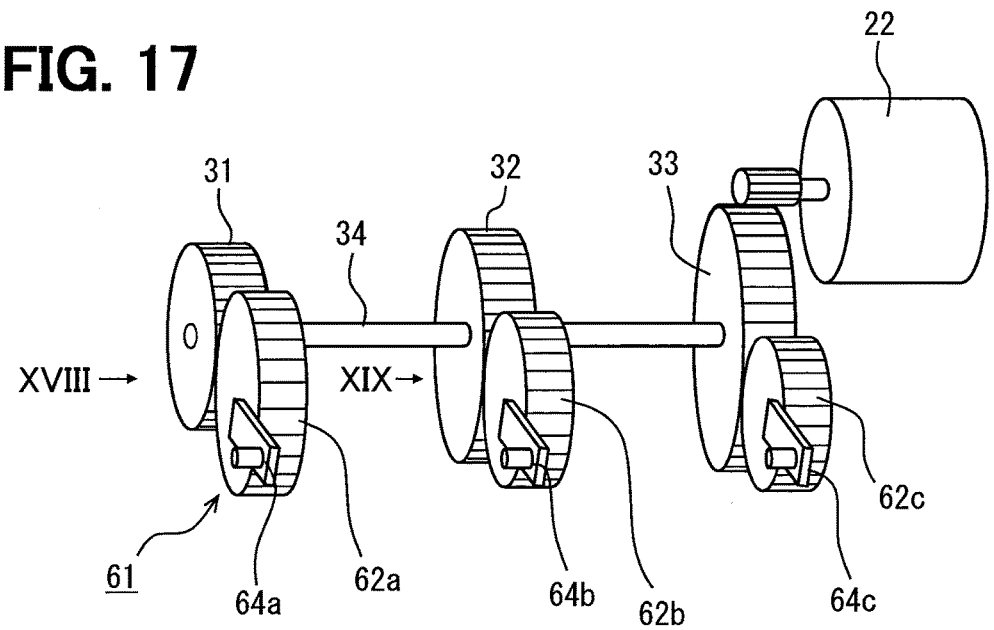
FIG. 17 is a schematic perspective diagram of the flow passage switching unit using a crank mechanism in a fifth embodiment.

Next, a fifth embodiment will be described. The characteristic features different from those in the above-described embodiments will be described. FIG. 17 is a schematic perspective diagram of the flow passage switching unit using a crank mechanism in the fifth embodiment. A crank mechanism 61 has crank gears 62a, 62b and 62c, the first body of rotation 31, the second body of rotation 32 and the third body of rotation 33, the common shaft 34, crank arms 64a, 64b and 64c and the like.

The first body of rotation 31 to drive the valving element 8 of the first rotary valve 1, the second body of rotation 32 to drive the valving element 8 of the second rotary valve 2 and the third body of rotation 33 to drive the valving element 8 of the third rotary valve 3 are provided. These bodies of rotation 31 to 33 drive the respective crank gears 62a, 62b and 62c and the respective crank arms 64a, 64b and 64c. Then, unknown crank rods connected to the ends of the respective crank arms 64a, 64b and 64c and the like are driven, to reciprocate-rotate drive the rotary shafts 9 and the valving elements 8 of the respective rotary valves 1, 2 and 3. Note that since FIG. 17 illustrates a schematically simplified diagram, illustration of a part of the components is omitted.

Figure 18:
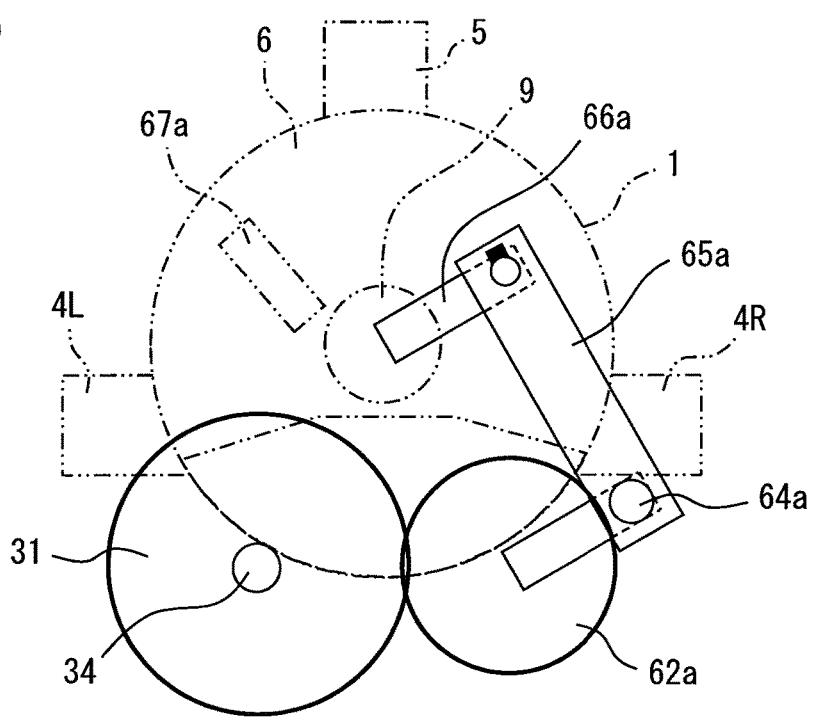
FIG. 18 is a schematic side diagram of the rotary valve and the crank mechanism viewed from an arrow XVIII direction in FIG. 17.

FIG. 18 shows the crank mechanism in the fifth embodiment and shows a structure viewed from an arrow XVIII direction in FIG. 17. In FIG. 18, the first body of rotation 31 is rotated with the common shaft 34 rotated with the motor as the driving source 22.

Next, the first crank gear 62a engaged with the first body of rotation 31 rotates. The first links 65a and 66a perform reciprocal motion with the first crank arm 64a which rotates integrally with the shaft center of the first crank gear 62a. A part of the rotary shaft 9 which rotates together with the internal valving element 8 is exposed to the outside of the casing 6 of the rotary valve 1.

Figure 19:
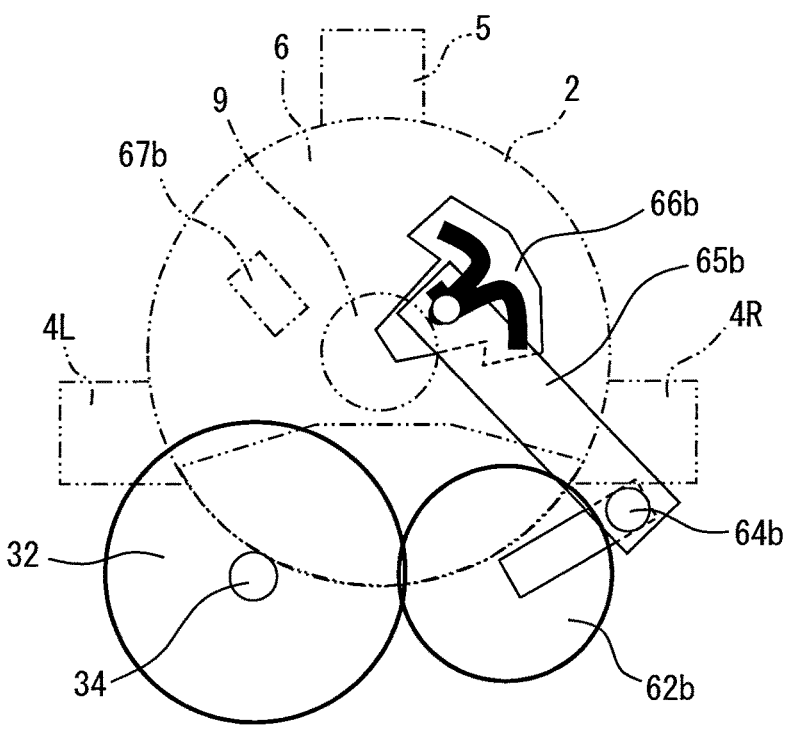
FIG. 19 is a schematic side diagram of the rotary valve and the crank mechanism viewed from an arrow XIX direction in FIG. 17.

FIG. 19 shows a structure viewed from an arrow XIX direction in FIG. 17. Note that the relation among the third body of rotation 33, the crank gear 62c and the crank arm 64c in FIG. 17 is similar to that in FIG. 19. In FIG. 19, the second body of rotation 32 is rotated with the common shaft 34 rotated with the motor as the driving source 22. Next, the second crank gear 62b engaged with the second body of rotation 32 rotates. A second link rod 65b and a cam plate 66b forming a second link perform reciprocal motion with the second crank arm 64b which rotates integrally with the shaft center of the second crank gear 62b.

In the cam plate 66b in which a ditch is formed, a pin of the second link rod 65b is slid in the ditch. With this arrangement, the cam plate 66b is driven by the reciprocal motion of the second link rod 65b. The motion of the cam plate 66b is transmitted to the rotary shaft 9 of the rotary valve 2 and the internal valving element 8. A stopper 67b to regulate the motion of the cam plate 66b is fixed integrally with the casing 6 of the rotary valve 2.

In the above-described structure, to ensure the valving element open angle (valving element opening angle) γo, the rotation angle is partially increased with the link mechanism. Further, stoppers 67a and 67b are fixed to the outside of the casing 6 of the respective rotary valves 1 and 2. As the stoppers 67a and 67b exist, the valving elements 8 of the respective rotary valves 1 and 2 are reciprocally movable within the range from −90° to +90°. Note that when the stoppers 67a and 67b do not exist, the valving element 8 performs rotational motion, and the feasibility of fluid switching pattern is lost.

Sixth Embodiment

Figure 20:
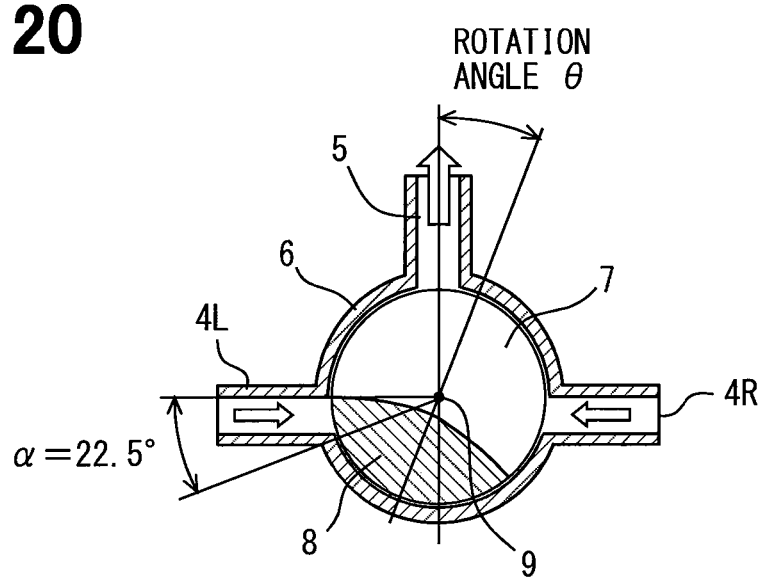
FIG. 20 is an internal structural diagram of the rotary valve in a sixth embodiment.

Next, a sixth embodiment will be described. The characteristic features different from those in the above-described embodiments will be described. FIG. 20 shows an internal structure of the rotary valve. The peripheral wall of the casing 6 is provided with the left side piping 4L and the right side piping 4R forming the first fluid port, and the discharge piping forming the second fluid port 5.

The space 7 in the casing 6 has a cylindrical shape, and the left side piping 4L, the right side piping 4R and the second fluid port 5 are provided in the peripheral wall in mutually different positions. The valving element 8 has a circular shape along the peripheral wall. As the rotary valve has the same structure as that of a general three-way valve, it can be easily manufactured. The port hole diameter angle (suction port opening angle) α is 22.5 degrees.

Figure 21:
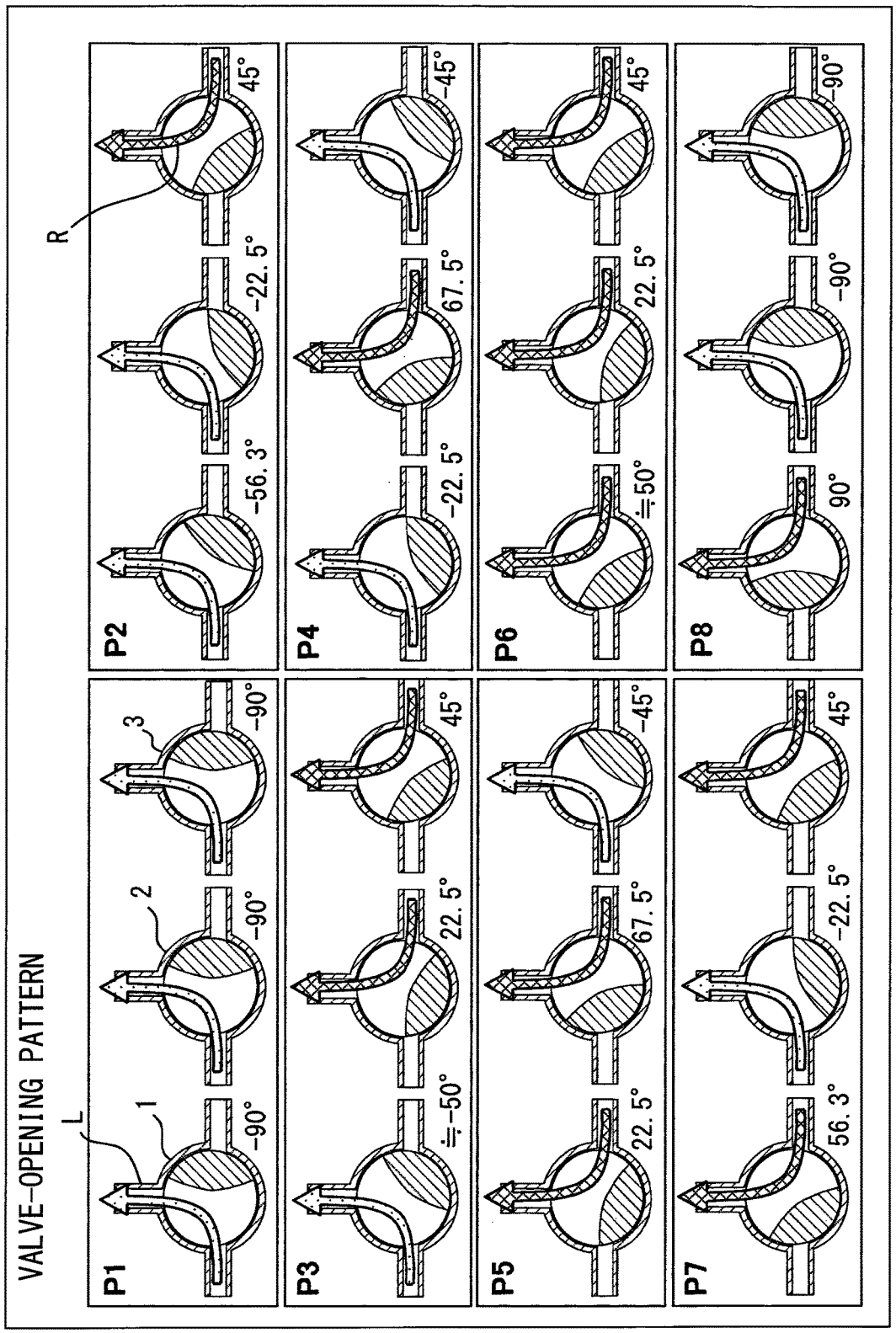
FIG. 21 is an internal structural diagram showing flow of the fluid in the respective rotary valves in the eight flow passage patters in the above-described sixth embodiment.

FIG. 21 shows the flow of the fluid in the three rotary valves in eight flow passage patterns in the sixth embodiment. Sequentially from the left, in the first rotary valve 1 (valve 1), the second rotary valve 2 (valve 2) and the third rotary valve 3 (valve 3), rotation angle and stop position of the valving element 8 are described. "L" indicates a valve mode indicating that the fluid flows through a left side suction pipe forming the left side piping 4L. In contrast, "R" indicates a valve mode where the fluid flows through a right side suction pipe forming the right side piping 4R.

As shown in FIG. 21, among the operation patterns, in a first pattern P1, the first rotary valve 1, the second rotary valve 2 and the third rotary valve 3, in this order, stop in the valve rotation angle positions of −90 degrees, −90 degrees and −90 degrees. Further, in a fifth pattern P5, the first rotary valve 1, the second rotary valve 2 and the third rotary valve 3, in this order, stop in the valve rotation angle positions of 22.5 degrees, 67.5 degrees and −45 degrees. Further, in an eighth pattern P8, the first rotary valve 1, the second rotary valve 2 and the third rotary valve 3, in this order, stop in the valve rotation angle positions of 90 degrees, −90 degrees and −90 degrees.

Seventh Embodiment

Figure 22:
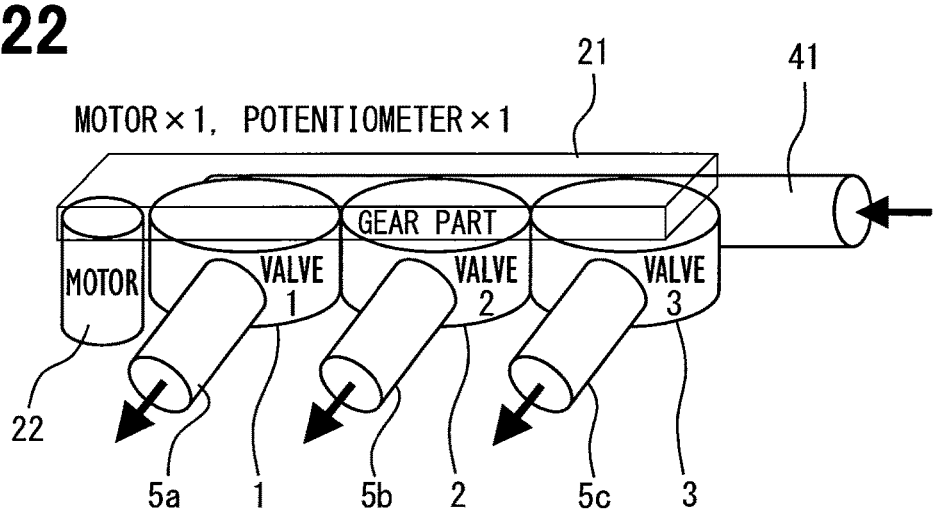
FIG. 22 is a schematic perspective diagram of the flow passage switching unit in a seventh embodiment.

Next, a seventh embodiment will be described. The characteristic features different from those in the above-described embodiments will be described. In FIG. 22, the flow passage switching unit is formed with a combination of 1-in 1-out respective rotary valves.

By the design of the opening shape of the valving element of the respective 1-in 1-out rotary valves 1, 2 and 3 and apposition of the three 1-in 1-out rotary valves, the driving mechanism 21 having a connection structure where the rotation angles of the valving elements 8 of the respective rotary valves 1, 2 and 3 are 1 to 2 to 3 is provided. With this arrangement, a 1-in 3-out flow passage switching unit using the single driving source 22 is formed.

In FIG. 22, in the plural rotary valves 1, 2 and 3, the unshown respective inner rotary shafts 9 are provided in a right angled direction with respect to the apposition direction of the rotary valves 1, 2 and 3 (horizontal direction in FIG. 22), and in parallel with each other. The driving mechanism 21 has a spur gear train rotated with the driving source 22. According to this arrangement, it is possible to obtain a flat flow passage switching unit having a small thickness in the direction of the rotary shaft 9 (thickness in the vertical direction in FIG. 22).

Figure 23:
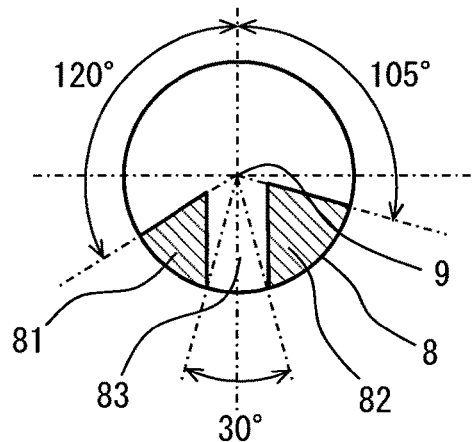
FIG. 23 is a plane diagram of the valving element in the respective rotary valves in the above-described seventh embodiment.

FIG. 23 shows a plane shape of the valving element 8 in the respective rotary valves 1, 2 and 3. The rotary shaft 9 of the valving element 8 extends in a front/rear direction of the sheet of FIG. 23, and in FIG. 22, extends in a vertical direction. The valving element 8 has an opening 83 in which the fluid flows between two solid projections 81 and 82.

Figure 24:
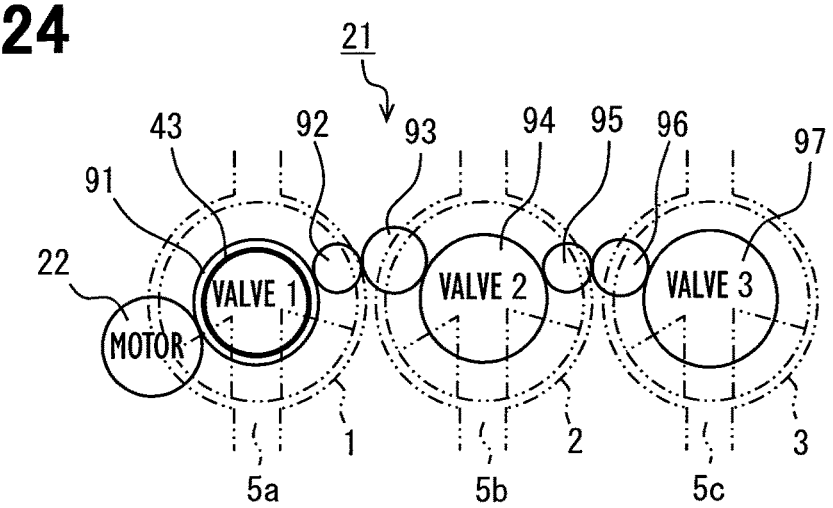
FIG. 24 is a schematic plane diagram of the flow passage switching unit in the above-described seventh embodiment.

FIG. 24 schematically shows a plane shape viewed from an upper direction of the sheet of FIG. 22 toward a lower direction of the sheet. A first valve gear 91 is rotated with an output gear of the motor forming the single driving source 22, and the rotation of the first valve gear 91 is transmitted via two coupling gears 92 and 93 to a second valve gear 94 to drive the second rotary valve 2.

Further, the rotation of the second valve gear 94 is transmitted via two coupling gears 95 and 96 to a third valve gear 97. Further, among the three (N=3) respective rotary valves 1, 2 and 3, when the rotation angle of the valving element 8 of the first rotary valve 1 is 1, rotation angle of the valving element 8 of the second rotary valve 2 is doubled. Further, the number of gears of the gear train to triple the rotation angle of the valving element 8 of the third rotary valve 3 is set.

In other words, as the rotation angle ratio of the internal respective valving elements 8, 1:2: . . . 2 to the (N−1)=4 holds. In this case, as the number of the rotary valves 1, 2 and 3 is three, it is possible to realize flow passage switching in 2 to the third power, i.e., eight patterns.

Figure 25:
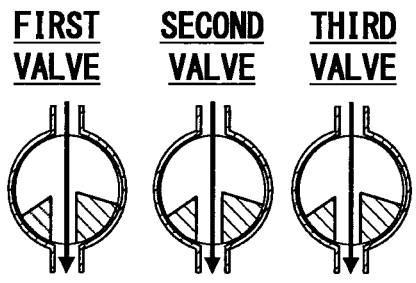
FIG. 25 is an internal structural diagram showing the flow of the fluid in the respective rotary valves in the eight flow passage patterns in the above-described seventh embodiment.
Figure 25:
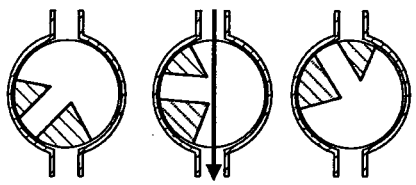
Figure 25:
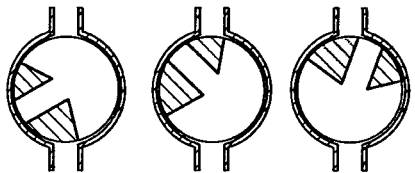
Figure 25:
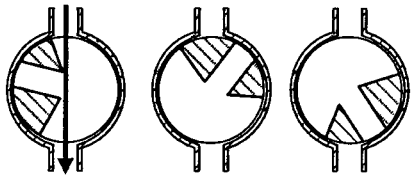
Figure 25:
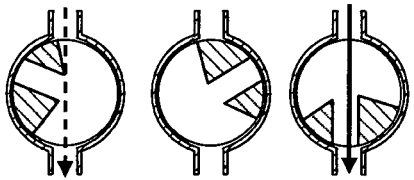
Figure 25:
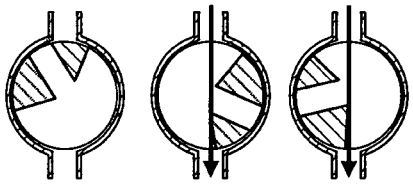
Figure 25:
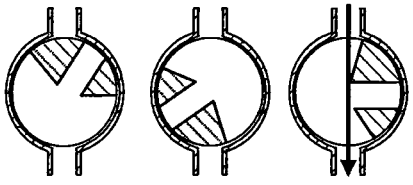
Figure 25:
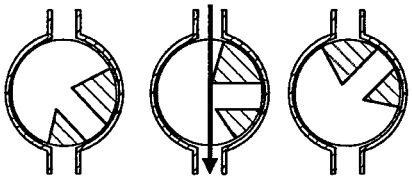

FIG. 25 is an internal structural diagram showing the flow of the fluid in the respective rotary valves 1, 2 and 3 (the first valve, the second valve and the third valve) in the eight flow passage patterns. The rotation angle (operation angle) of the first rotary valve (the first valve) such as 0 degrees, 50 degrees, 67 degrees . . . 315 degrees are shown on the left side. At the rotation angle (the valve 1 operation angle) of 0 degrees, the fluid flows through the opening of all the valving elements 8 of the first valve to the third valve.

At the rotation angle (the valve 1 operation angle) of 120 degrees, the fluid flows in a flow-amount regulated status to the first valve, and the mode becomes the flow regulation mode as indicated with a dashed line arrow. Further, at the rotation angle (the valve 1 operation angle) of 147 degrees, the first valve enters the shut status, and the fluid flows to the second valve and the third valve as indicated with a solid line. In this case, the fluid flows from the first port connected to the common fluid piping 41 to the second port.

In the above-described seventh embodiment, in the plural rotary valves 1, 2 and 3, as the respective rotary shafts 9 are arrayed in a right angled direction with respect to the apposition direction of the plural rotary valves 1, 2 and 3 and provided in parallel with each other, it is possible to obtain a flat flow passage switching unit in which the thickness in a rotation axis direction is small.

Eighth Embodiment

Hereinbelow, another embodiment will be described. In the above-described embodiments, the plural rotary valves having the same internal structure are arrayed. However, as in the case of the embodiment described below, plural rotary valves having different internal structures may be driven with a single driving mechanism and driven such that the positions of the valving elements of the rotary valves are mutually different.

Figure 26:
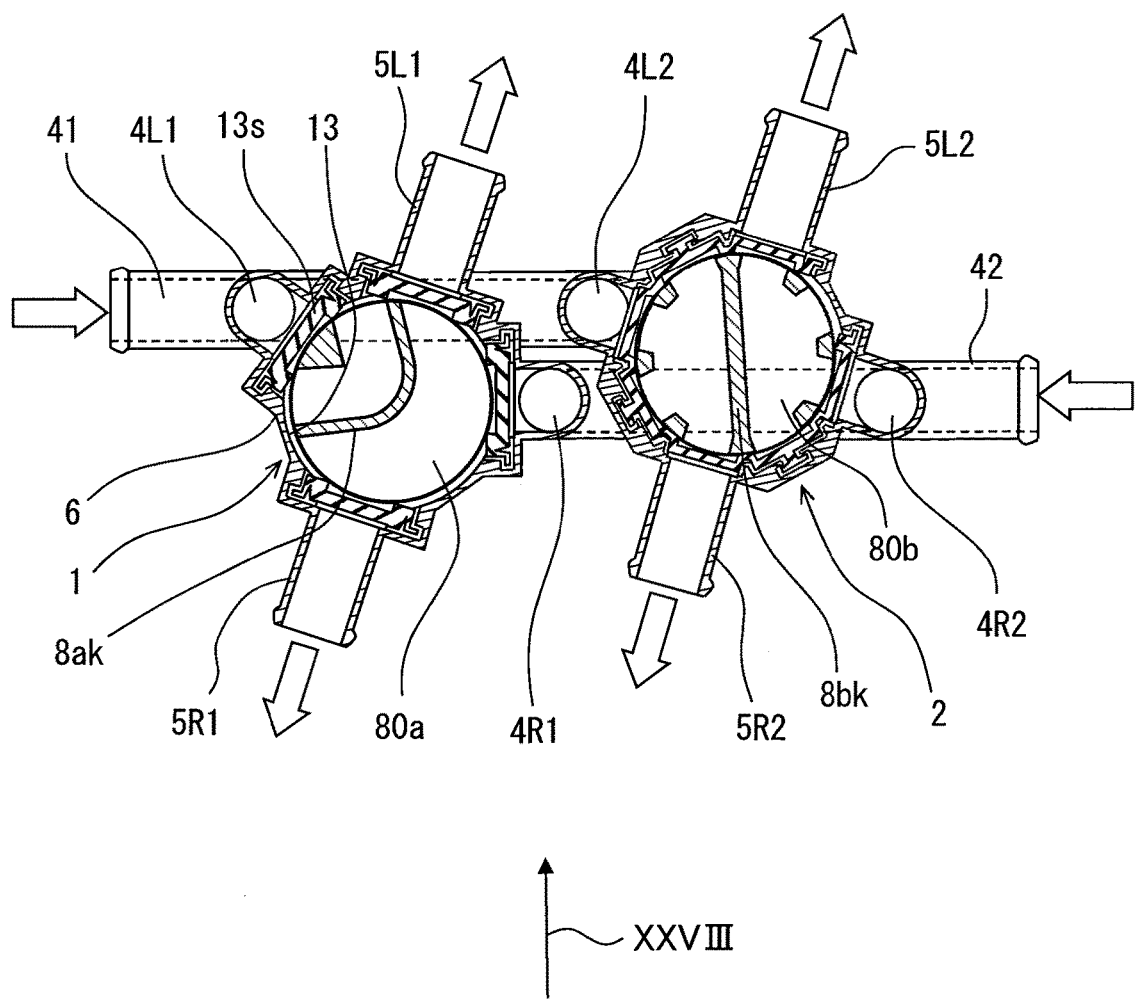
FIG. 26 is a partial cross-sectional diagram along an arrow XXVI-XXVI line in FIG. 28 showing an eighth embodiment.

An eighth embodiment will be described. The characteristic features different from those in the above-described embodiments will be described. FIG. 26 shows the eighth embodiment along an arrow XXVI-XXVI line in FIG. 28. The flow passage switching unit in FIG. 26 has apposed plural rotary valves 1 and 2.

The respective rotary valves 1 and 2 have the casing 6, side walls which are formed inside the casing 6 and which are opposed, and the peripheral wall 13 formed between these side walls. The peripheral wall 13 is provided with plural seal rubber 13s of EPDM. Note that in FIG. 26, the side walls are positioned on the front side and back side of the sheet and they are not seen.

The peripheral wall 13 of the rotary valve 1 is provided with first fluid ports 4L1 and 4R1. The first fluid ports 4L1 and 4R1 are respectively connected to the first common fluid piping 41 and the second common fluid piping 42. The first common fluid piping 41 and the second common fluid piping 42 form a first suction port 41 and a second suction port 42.

Further, the peripheral wall 13 of the rotary valve 1 is provided with second fluid ports 5L1 and 5R1. The second fluid ports 5L1 and 5R1 form a first discharge port 5L1 and a second discharge port 5R1. Note that when they are simply referred to as a second fluid port 5, it indicates both of the first fluid ports 5L1 and 5R1.

Similarly, the peripheral wall of the rotary valve 2 is provided with first fluid ports 4L2 and 4R2. The first fluid ports 4L2 and 4R2 are respectively connected to the first common fluid piping 41 and the second common fluid piping 42. Further, the peripheral wall 13 of the rotary valve 2 is provided with second fluid ports 5L2 and 5R2. The second fluid ports 5L2 and 5R2 form a first discharge port 5L2 and a second discharge port 5R2. Note that when they are referred to a second fluid port 5 simply regarding the rotary valve 2, it indicates both of the first fluid ports 5L2 and 5R2.

Figure 27A:
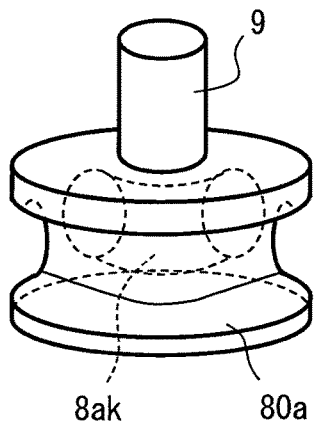
FIG. 27A is a perspective diagram of the valving element of a first rotary valve shown in FIG. 26.
Figure 27B:
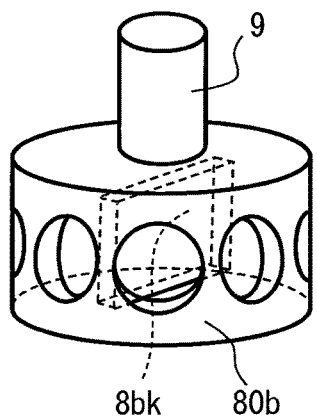
FIG. 27B is a perspective diagram of the valving element of a second rotary valve shown in FIG. 26.

FIG. 27A and FIG. 27B illustrate the valving elements of the respective rotary valves 1 and 2 shown in FIG. 26. In FIG. 27A and FIG. 27B, valving elements 80a and 80b of the respective rotary valves 1 and 2 (when generally called, referred to as a valving element 8) have respectively different structures. These valving elements 8 are connected to the rotary shaft 9. As it is found from FIG. 26, the valving element 80a has a bent approximately U-shaped partition walls 8ak, and the valving element 80b has an approximately I-shaped partition wall 8bk. The flows of the fluids through the partition wall 8ak and 8bk in the valving element 8 are blocked with these partition walls 8ak and 8bk.

Figure 28:
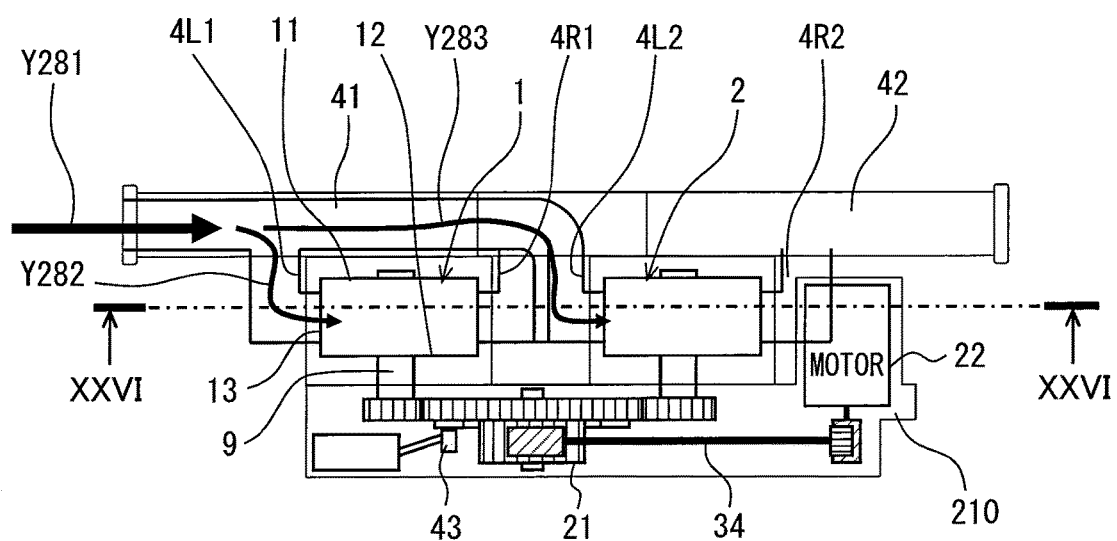
FIG. 28 is a schematic structural diagram of the flow passage switching unit viewed from an arrow XXVIII direction in FIG. 26.

FIG. 28 shows the flow passage switching unit viewed from an arrow XXVIII direction in FIG. 26. In FIG. 28, the rotary shafts 9 of the respective rotary valves 1 and 2 are connected to a gear mechanism forming the driving mechanism 21. The rotation of the motor forming the driving source 22 is transmitted to the gear mechanism forming the driving mechanism 21 via the common rotary shaft 34 forming a motor torque transmission unit. The driving mechanism 21 is accommodated in a driving mechanism storage unit 210.

The rotary valve 1 is provided with the first fluid ports 4L1 and 4R1. The first fluid port 4L1 and 4R1 are respectively connected to the first common fluid piping 41 and the second common fluid piping 42.

The second fluid ports 5L1 and 5R1 (FIG. 26) provided in the rotary valve 1 are omitted in FIG. 28. Similarly, the rotary valve 2 is provided with the first fluid ports 4L2 and 4R2. The first fluid ports 4L2 and 4R2 are respectively connected to the first common fluid piping 41 and the second common fluid piping 42. The second fluid ports 5L2 and 5R2 (FIG. 26) provided in the rotary valve 2 are omitted in FIG. 28.

Figure 29:
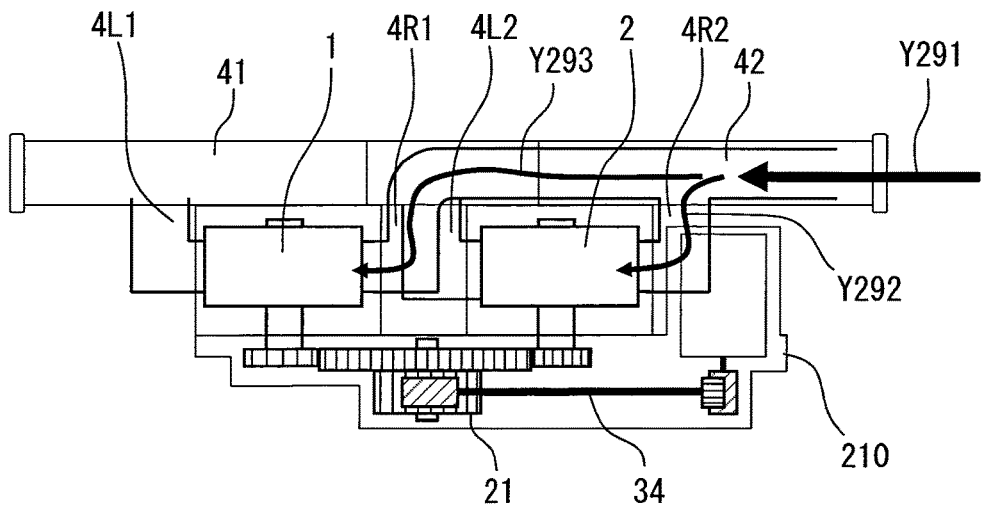
FIG. 29 is a schematic structural diagram illustrating a structure of the flow passage switching unit viewed from the arrow XXVIII direction in FIG. 26, in another perspective, different from FIG. 28.

In FIG. 28, as in the case of the flow of cooling water indicated with arrows Y281 to Y283, the cooling water flows from the first common fluid piping 41 into the first fluid ports 4L1 and 4L2. FIG. 29 shows a structure in another perspective of the flow passage switching unit viewed from an arrow XXVIII direction in FIG. 26. In FIG. 29, as in the case of the flow of cooling water indicated with arrows Y291 to Y293, the cooling water flows from a first common fluid piping 42 into the first fluid ports 4R1 and 4R2.

The rotation angle detecting device (potentiometer) 43 shown in FIG. 28 detects a rotation angle (position) based on electrical resistance. It may be arranged, as the rotation angle detection device 43, a magnetic body is provided on the body of rotation to perform non-contact detection on change of the magnetic body with a Hall device, or a rotating disc is provided with a slit to perform integral measurement on its rotation angle with an optical sensor. Further, the driving mechanism 21 has a gear mechanism to produce differential rotation of the valving elements 80*a* and 80*b* (FIG. 26), however, the differential rotation is not limited to the gear mechanism, but may be formed with any of a link mechanism, a cam mechanism and a pulley using mechanism, or multiple combinations thereof.

Note that in FIG. 26, the first common fluid piping 41 and the second common fluid piping 42 form the first suction port 41 and the second suction port 42, however, the flow of the fluid in the respective ports may be reversed and used. For example, the first common fluid piping 41 and the second common fluid piping 42 may be used as the first discharge port 41 and the second discharge port 42.

Further, the eighth embodiment has a 2-input 4-output flow passage switching unit. Then it has the two valving elements 80*a* and 80*b* are provided. The respective valving elements 80*a* and 80*b* are four-way valves, and by connecting the respective valving elements 80*a* and 80*b* with a rotation angle ratio 4:5, eight flow passage patterns are realized while the valving element 8 rotates twice.

The flow passage switching unit in the eighth embodiment can be used in a hydraulic circuit to selectively distribute cooling water in two systems (two systems with different temperature bands) in correspondence with temperature requirement from any of a device to be cooled, a temperature controller, a cold/warm water generator, a cold heat storage device and the like connected to the output port.

Further, as the above-described flow passage switching unit distributes cooling water in different temperature bands in correspondence with requirement from the above-described respective devices, it is possible to utilize waste heat of the device as a heating source or a heat sink of another device. Further, when cooling and heating temperatures are reserved in a heat accumulator and when there is a device requiring cooling and warming water, it is possible to attain a flow passage switching unit to conduct heat management by controlling the flow passage pattern so as to let the cooling and warming heat accumulator communicate with the device requiring the cooling and warming water.

Note that in the case of the above use, the flow passage switching unit in this embodiment is installed on the upstream side and on the downstream side of the above-described respective devices. Then, by respectively providing the flow passage switching unit on the upstream side and the downstream side, it is possible to increase the flow passage patterns in comparison with a case where only one flow passage switching unit is installed.

As described above, the eight flow passage switching patterns are realized while the valving element 8 rotates twice, the eight flow passage patters are sufficient since devices having opposite temperature requirements and system communication requirements are connected to a pair of discharge ports. All the flow passage switching patterns in the case of 4 outputs is 2 to the fourth power=16 patterns. When one pair (2-outputs) flow passage patterns are opposite to each other, the 2 to the second power×2=8 patterns satisfy the all. Note that including blocking of flow passage, 3 to the fourth power=108 patterns of flow passage switching patterns exist. Hereinbelow, it will be described in more detail.

Figure 30:
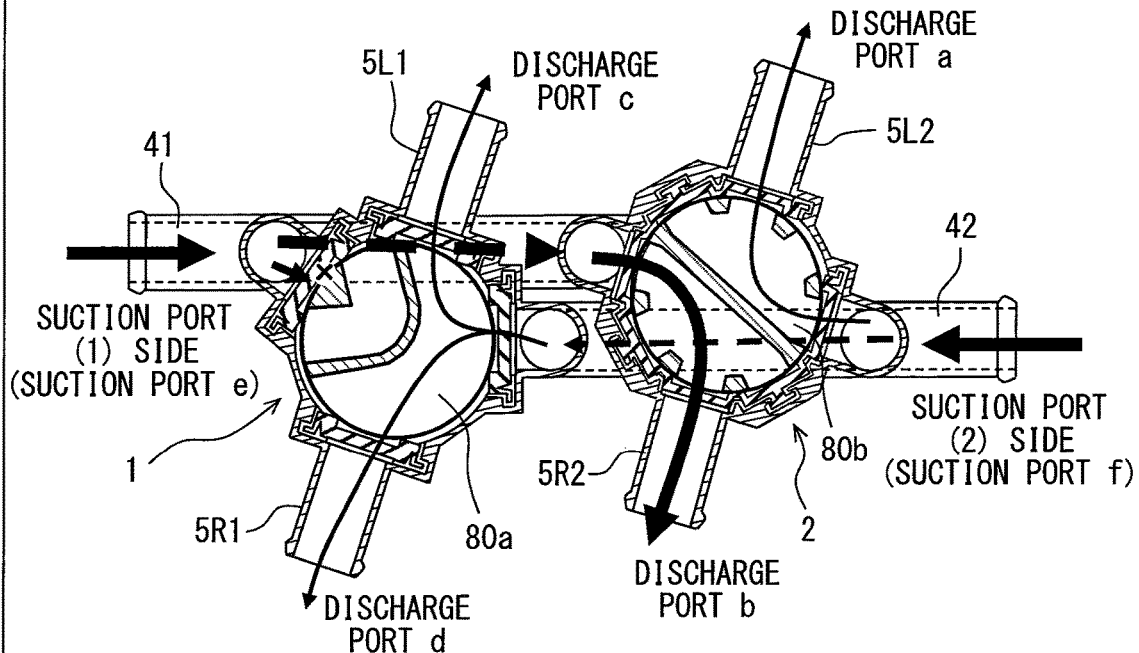
FIG. 30 is an explanatory diagram showing the flow of the fluid in an operation pattern 1 in the above-described eighth embodiment, when valving element rotation angles of the respective valving elements of the respective rotary valves are both 0 degrees.

FIG. 30 shows the flow of the fluid in the case of basic status (operation pattern 1) where the valving element rotation angles of the valving element 80*a* and the valving element 80*b* of the respective rotary valves 1 and 2 are both 0 degrees (0 deg) in the above-described eighth embodiment.

FIG. 31 shows the valving element rotation angles of the valving element 80*a* (also referred to as a valving element A) and the valving element 80*b* (also referred to as a valving element B) of the respective rotary valves 1 and 2, and the flow of the fluid discharged from the discharge ports a to d shown in FIG. 30 and the like, in the above-described eighth embodiment. Further, it shows whether the fluid flows on the side of the suction port (1) (also first common fluid piping 41 or port e) shown in FIG. 30 and the like or on the side of the suction port (2) (also the second common fluid piping 42 or port f).

In the operation table of FIG. 31, "4way" indicates a four-way valve. Further, bold lines L1 and L2 indicate that the valving element 8 has rotated once at this point. Further, "null" indicates the valving element 8 stops in an unintended (unused) position where the suction port (1) side and the suction port (2) side are connected with each other.

As it is fund from FIG. 30 and FIG. 31, in the case of the basic status (operation pattern 1) where the valving element rotation angles of the valving elements 80*a* and 80*b* of the respective rotary valves 1 and 2 are both 0 degrees (0 deg), the cooling water sucked from the suction port (2) side is discharged from the discharge port a. Then, the cooling water sucked from the suction port (1) side is discharged from the discharge port b, and the cooling water sucked from the suction port (2) side is discharged from the discharge port c. Further, the cooling water sucked from the suction port (2) side is discharged from the discharge port d.

Figure 32:
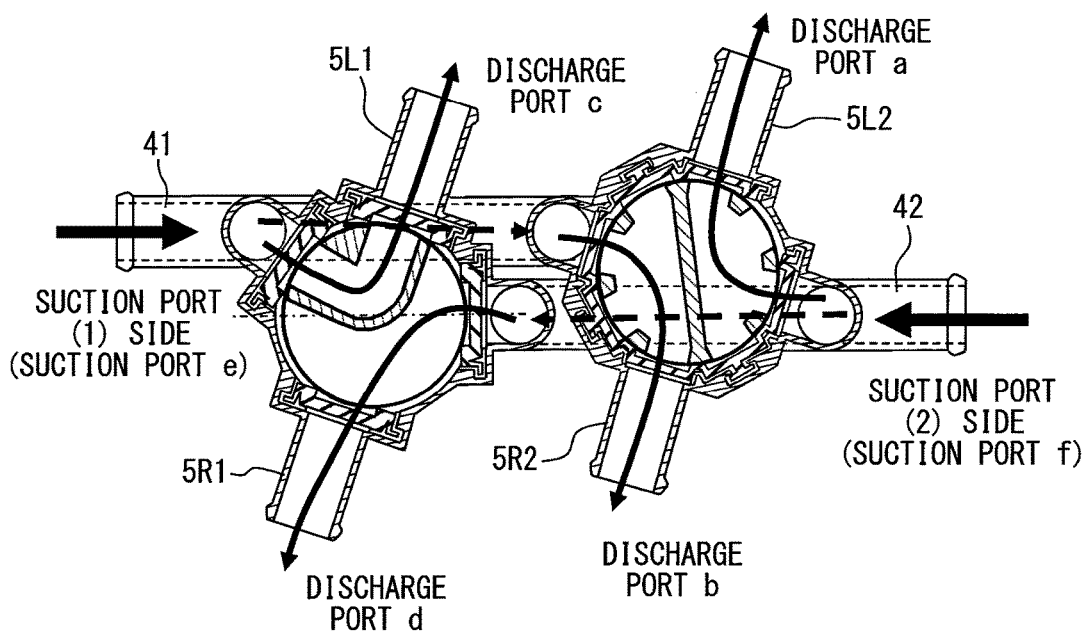
FIG. 32 is an explanatory diagram showing the flow of the fluid in an operation pattern 2 in the above-described eighth embodiment, when the valving element rotation angles of the valving elements of the respective rotary valves are 36 degrees and 45 degrees.
Figure 33:
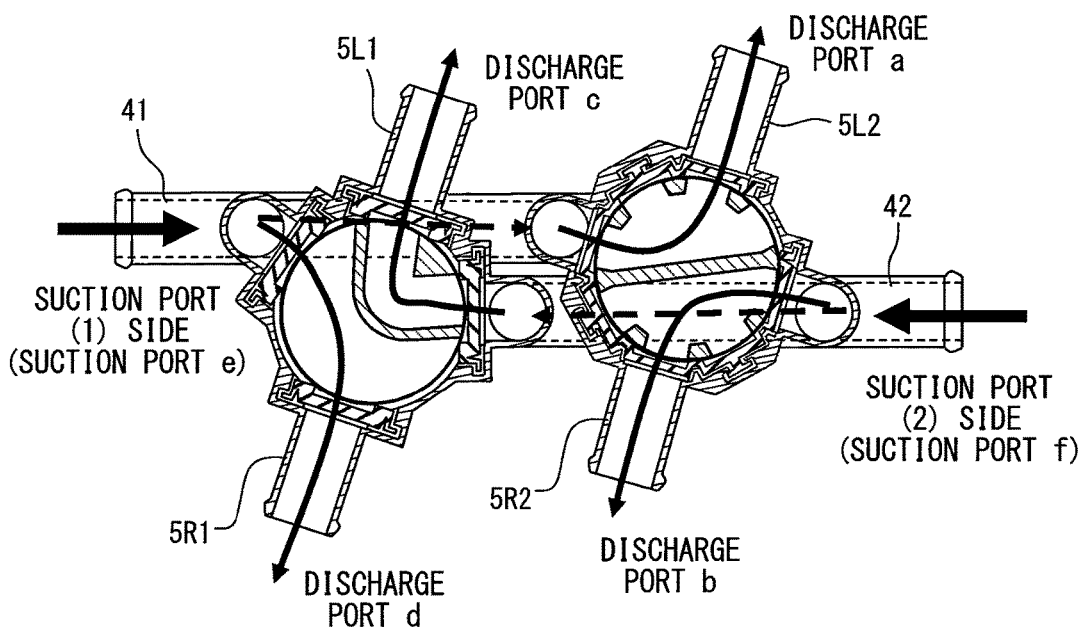
FIG. 33 is an explanatory diagram showing the flow of the fluid in an operation pattern 3 in the above-described eighth embodiment, when the valving element rotation angles of the valving elements of the respective rotary valves are 108 degrees and 135 degrees.

FIG. 32 shows the flow of the fluid in the case of the operation pattern 2 where the valving element rotation angles of the valving elements 80*a* and 80*b* of the respective rotary valves 1 and 2 are 36 degrees and 45 degrees, in the above-described eighth embodiment. FIG. 33 shows the flow of the fluid in the case of the operation pattern 3 where the valving element rotation angles of the valving elements 80*a* and 80*b* of the respective rotary valves 1 and 2 are 108 degrees and 135 degrees, in the above-described eighth embodiment.

Figure 34:
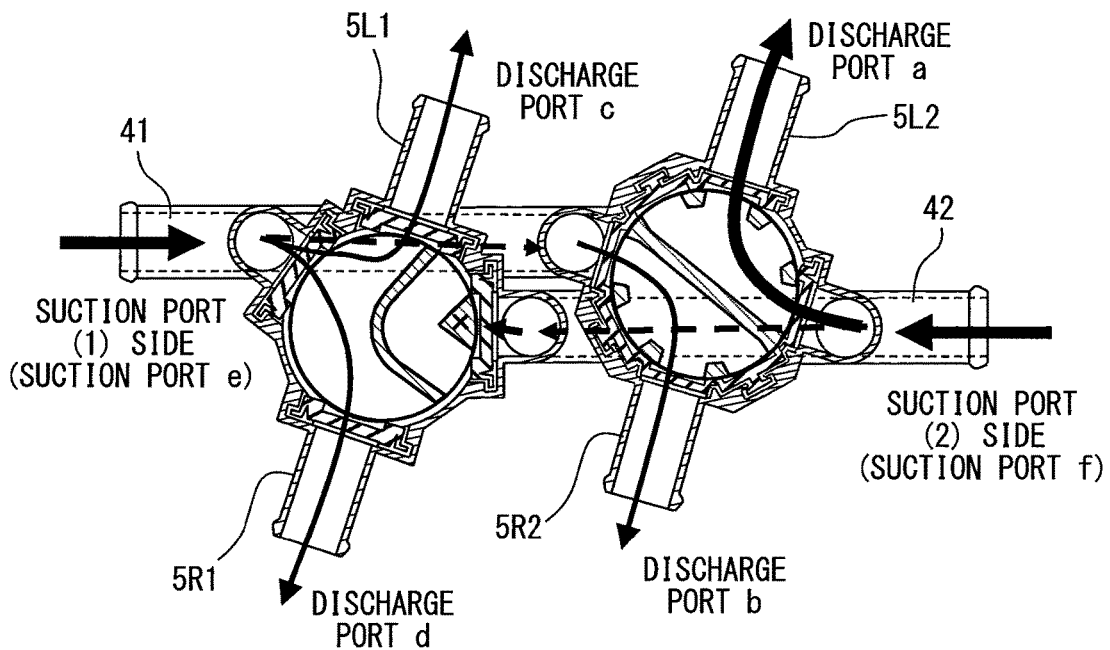
FIG. 34 is an explanatory diagram showing the flow of the fluid in an operation pattern 4 in the above-described eighth embodiment, when the valving element rotation angles of the valving elements of the respective rotary valves are 144 degrees and 180 degrees.

FIG. 34 shows the flow of the fluid in the case of the operation pattern 4 where the valving element rotation angles of the valving elements 80*a* and 80*b* of the respective rotary valves 1 and 2 are 144 degrees and 180 degrees, in the above-described eighth embodiment. FIG. 35 shows the flow of the fluid in the case of the operation pattern 5 where the valving element rotation angles of the valving elements 80*a* and 80*b* of the respective rotary valves 1 and 2 are 360 degrees and 450 degrees, in the above-described eighth embodiment.

Figure 36:
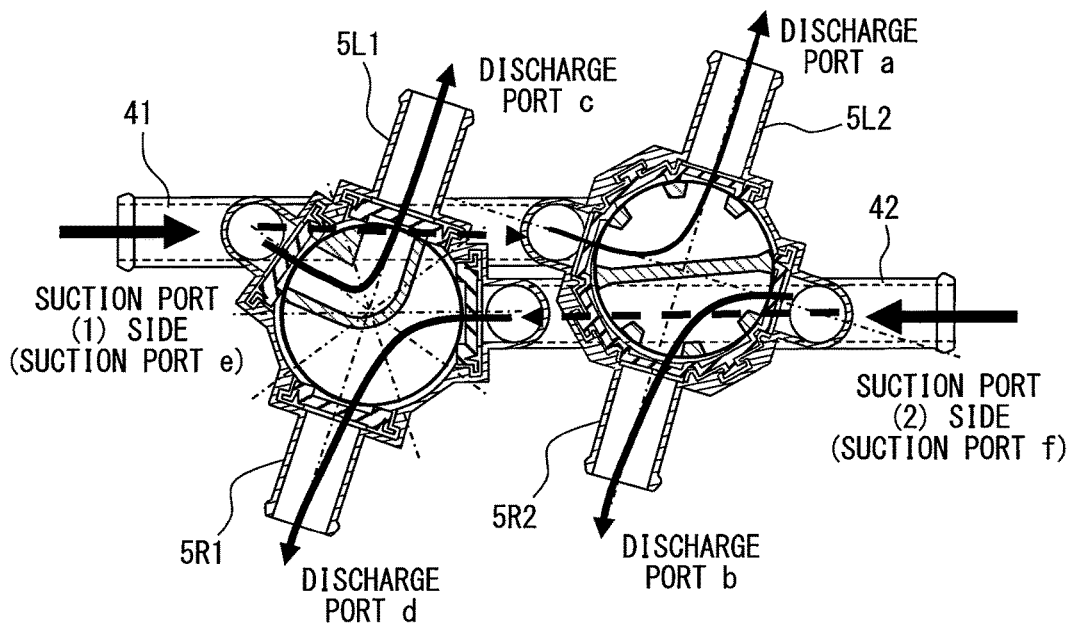
FIG. 36 is an explanatory diagram showing the flow of the fluid in an operation pattern 6 in the above-described eighth embodiment, when the valving element rotation angles of the valving elements of the respective rotary valves are 396 degrees and 495 degrees.
Figure 37:
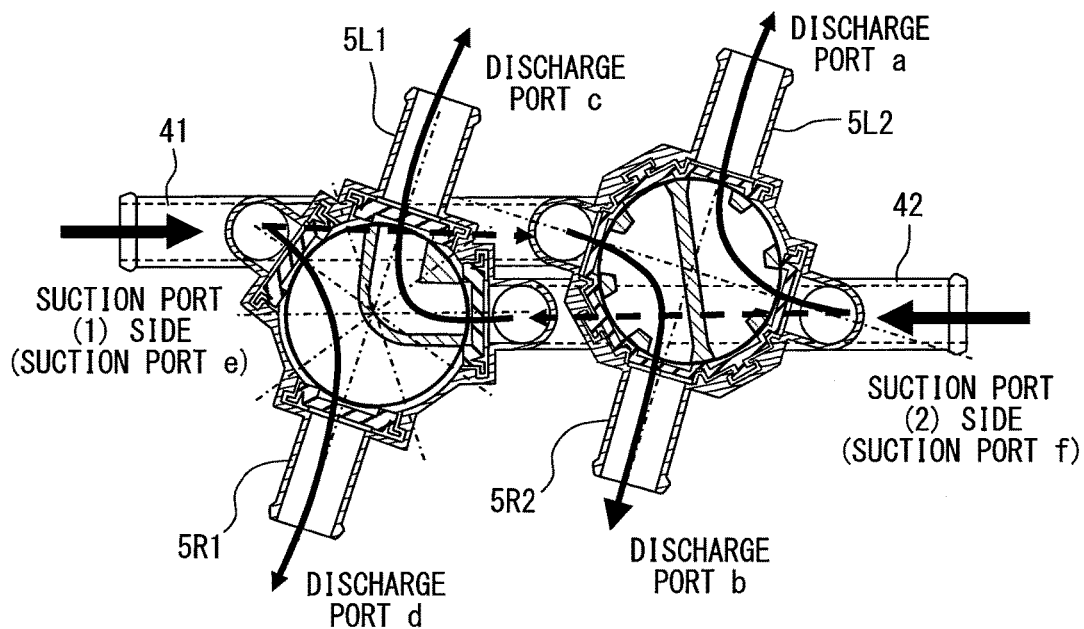
FIG. 37 is an explanatory diagram showing the flow of the fluid in an operation pattern 7 in the above-described eighth embodiment, when the valving element rotation angles of the valving elements of the respective rotary valves are 468 degrees and 585 degrees.
Figure 38:
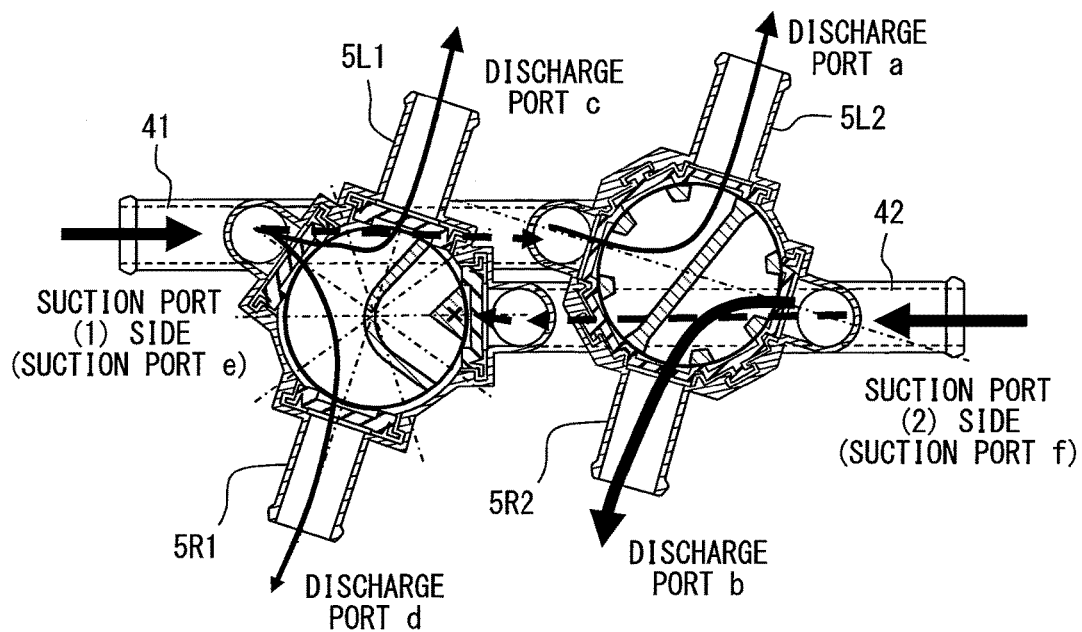
FIG. 38 is an explanatory diagram showing the flow of the fluid in an operation pattern 8 in the above-described eighth embodiment, when the valving element rotation angles of the valving elements of the respective rotary valves are 504 degrees and 630 degrees.

FIG. 36 shows the flow of the fluid in the case of the operation pattern 6 where the valving element rotation angles of the valving elements 80*a* and 80*b* of the respective rotary valves 1 and 2 are 396 degrees and 495 degrees, in the above-described eighth embodiment. FIG. 37 shows the flow of the fluid in the case of the operation pattern 7 where the valving element rotation angles of the valving elements 80*a* and 80*b* of the respective rotary valves 1 and 2 are 468 degrees and 585 degrees, in the above-described eighth embodiment. Further, FIG. 38 shows the flow of the fluid in the case of the operation pattern 8 where the valving element rotation angles of the valving elements 80*a* and 80*b* of the respective rotary valves 1 and 2 are 504 degrees and 630 degrees, in the above-described eighth embodiment.

The above descriptions will be summarized as follows. In the eighth embodiment, the peripheral wall 13 of the rotary valve 1 is provided with the first fluid ports 4L1 and 4R1 (FIG. 26). The first fluid ports 4L1 and 4R1 are respectively connected to the first common fluid piping 41 and the second common fluid piping 42. Further, the peripheral wall 13 of the rotary valve 1 is provided with the second fluid ports 5L1 and 5R1.

Similarly, the peripheral wall 13 of the rotary valve 2 is provided with the first fluid ports 4L2 and 4R2. The first fluid ports 4L2 and 4R2 are respectively connected to the first common fluid piping 41 and the second common fluid piping 42. Further, the peripheral wall 13 of the rotary valve 2 is provided with the second fluid ports 5L2 and 5R2.

The valving elements 80*a* and 80*b* of the respective rotary valves 1 and 2 have respectively different structures. The valving element 80*a* has the bent approximately U-shaped partition wall 8*ak*, and the valving element 80*b* has the approximately I-shaped partition wall 8*bk*. The rotary shafts 9 (FIG. 28) of the respective rotary valves 1 and 2 are connected to the gear mechanism forming the driving mechanism 21. The rotation of the motor forming the driving source 22 is transmitted to the gear mechanism forming the driving mechanism 21 via the common rotary shaft 34 forming the motor torque transmission unit.

For example, as shown in FIG. 26, the cooling water flows from the first common fluid piping 41 into the first fluid ports 4L1 and 4L2. Further, the cooling water flows from the second common fluid piping 42 into the first fluid ports 4R1 and 4R2.

Note that the first common fluid piping 41 and the second common fluid piping 42 form the first suction port 41 and the second suction port 42, however, the flow of the fluid in the respective ports may be reversed and used. For example, the first common fluid piping 41 and the second common fluid piping 42 may be used as the first discharge port and the second discharge port 42.

Further, the above-described flow passage switching unit performs 2-input 4-output flow passage switching. It has two valving elements 8, and the respective valving elements 8 are four-way valves. As the respective valving elements 8 are connected at the rotation angle ratio of 4:5 and rotated, the eight flow passage switching patterns (operation patterns) are realized while the valving elements 8 rotate twice.

The effects of the eighth embodiment will be described. In the above-described eighth embodiment, as shown in FIG. 26 and the like, the apposed plural rotary valves 1 and 2 are provided. The respective rotary valves 1 and 2 have the casing 6, the side walls 11 and 12 (FIG. 28) which are formed inside the casing 6 and which are opposed, and the peripheral wall 13 formed between these side walls 11 and 12.

Then, as shown in FIG. 26, the respective rotary valves 1 and 2 have at least one first fluid ports 4L1 and 4R1 (or 4L2 and 4R2) provided in the peripheral wall 13 and the second fluid ports 5L1 and 5R1 (or 5L2 and 5R2) provided in the peripheral wall 13.

Further, the respective rotary valves 1 and 2 have the valving element 8 (80*a* and 80*b*) rotatably supported with the rotary shaft 9 extending in the direction connecting the side walls 11 and 12 opposed inside the casing 6 (FIG. 27A, FIG. 27B and FIG. 28). Then, with the rotation of the valving element 8, a flow passage where the first fluid ports 4L1 and 4R1 (or 4L2 and 4R2) and the second fluid ports 5L1 and 5R1 (or 5L2 and 5R2) in FIG. 26 selectively communicate with each other is formed. Further, for this purpose, the driving mechanism 21 (FIG. 28) to drive the respective valving elements 80*a* and 80*b* by respectively predetermined rotation angles is provided.

The driving mechanism 21 has the single driving source 22 and the motive power transmission member to transmit the rotation motive power of the single driving source 22 to the respective rotary valves 1 and 2. The motive power of the driving source 22 is transmitted to the respective rotary shafts 9 of the plural rotary valves 1 and 2. As a result, the positions of the respective valving elements 8 with respect to the first fluid ports 4L1 and 4R1 (or 4L2 and 4R2) and the second fluid ports 5L1 and 5R1 (or 5L2 and 5R2) are driven to mutually different positions.

According to this arrangement, it is possible to provide the plural rotary valves 1 and 2 having the first fluid ports 4L1 and 4R1 (or 4L2 and 4R2) and the second fluid ports 5L1 and 5R1 (or 5L2 and 5R2) and to perform switching among plural flow passages with the single driving source 22. Further, as the plural rotary valves 1 and 2 are provided, it is possible to shorten the whole length of the rotary shaft 9 in its axial direction, and it is possible to perform switching among a comparatively large number of flow passages. Note that the second fluid ports may be a single port.

Next, as shown in FIG. 26, the respective first fluid ports 4L1 and 4R1 (or 4L2 and 4R2) of the plural rotary valves 1 and 2 are connected to the common fluid pipings 41 and 42. Further, the plural rotary valves 1 and 2 are mechanically connected to the common fluid pipings 41 and 42. According to this arrangement, as the plural rotary valves 1 and 2 are respectively connected to the common fluid pipings 41 and 42, it is possible to enhance the connection strength of the plural rotary valves 1 and 2 with the common fluid pipings 41 and 42.

Further, the plural valving elements 8 connected to the driving mechanism 21 (FIG. 28) repeat rotating by respectively predetermined rotation angles and stopping. At least a pair of valving elements 8 rotate by mutually different rotation angles and stop. According to this arrangement, it is possible to appose plural rotary valves 1 and 2 and perform switching among a large number of patterns of flow passages.

Further, the second fluid ports 5L and 5R provided in the peripheral wall 13 have plural ports. Since at least a pair of rotary valves 1 and 2 have different shapes, the valving elements 8 form a complicated flow passage by interlock between the plural rotary valves 1 and 2.

Ninth Embodiment

Figure 39:
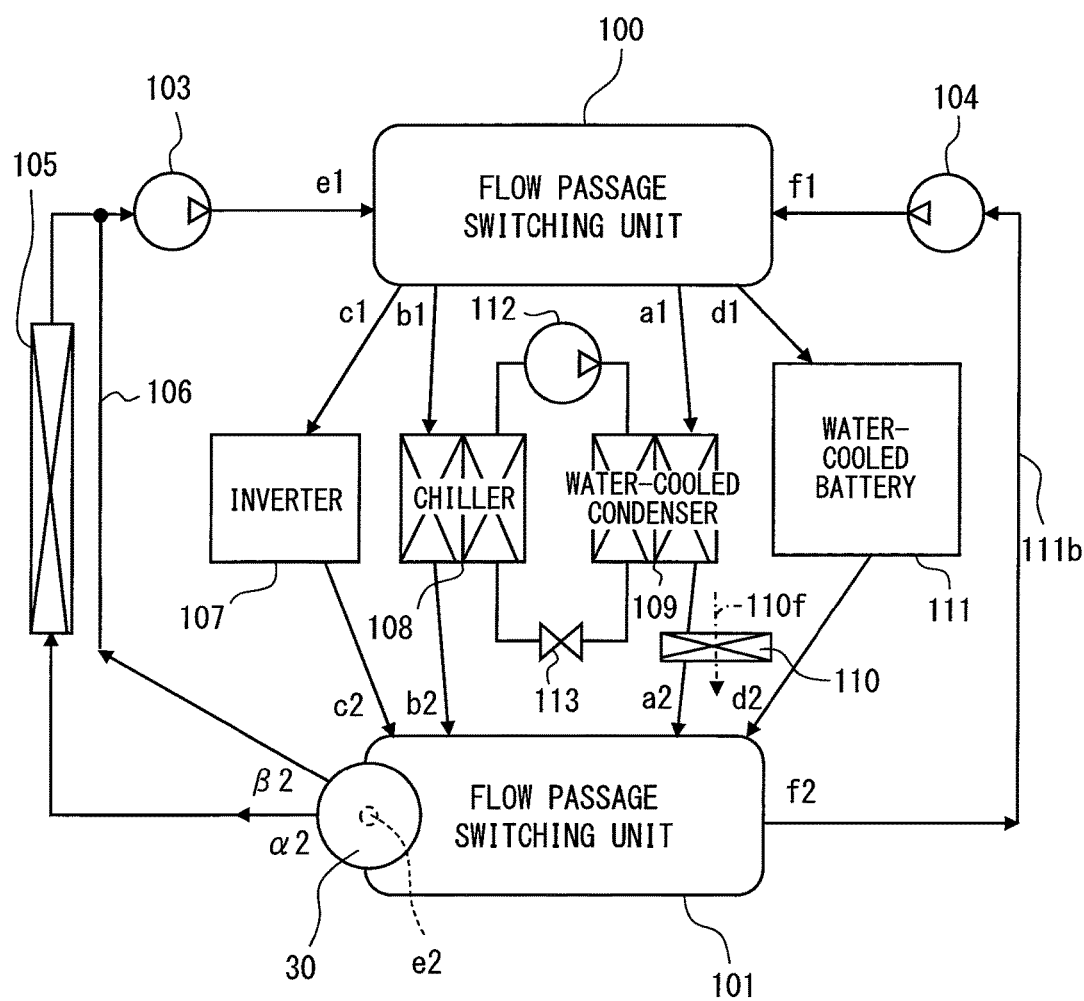
FIG. 39 is a piping structural diagram of a temperature controller of an in-vehicle device using the flow passage switching unit showing a ninth embodiment.

Next, a ninth embodiment will be described. The characteristic features different from those in the above-described embodiments will be described. FIG. 39 shows a temperature controller as an in-vehicle unit using the flow passage switching unit showing the ninth embodiment. In FIG. 39, two flow passage switching units 100 and 101 are provided, and in-vehicle plural units are connected via piping between these flow passage switching units 100 and 101. The flow passage switching unit 100 in FIG. 39 is identical to the eighth embodiment shown in FIG. 26.

An independent control valve (four-way valve which is not used while one port is closed) 30, independently driven with the flow passage switching unit of the eighth embodiment shown in FIG. 26 is attached to the flow passage switching unit 101 in FIG. 39.

In the flow passage switching unit 101 in FIG. 39, the direction of the fluid flowing through the first common fluid piping 41 and the first common fluid piping 42 is opposite to that in the flow passage switching unit in the eighth embodiment shown in FIG. 26, FIG. 30 and the like. That is, the first common fluid piping 41 and the first common fluid piping 42 are both used as a discharge port.

Then in the flow passage switching unit 101 in FIG. 39, the independent control valve 30 is attached to, e.g., the end of the first common fluid piping 41 (port e2) in FIG. 30. Note that the flow passage switching unit in FIG. 42 and FIG. 43 (twelfth and thirteenth embodiments) to be described later, in which this independent control valve is integrated as a flow passage switching unit, may be used as the flow passage switching unit 101 in FIG. 39.

Further, in FIG. 39, the cooling water flows from a radiator system pump 103 into a port e1 of the flow passage switching unit 100. Further, the cooling water from a bypass channel 111b from an internal circulation system pump 104 flows into a port f1 of the flow passage switching unit 100. The cooling water is supplied from port α2 and β2 of the independent control valve 30 to a radiator 105 and a radiator bypass channel 106. The ports a to f shown in FIG. 30 and the like are inscribed in FIG. 39 as a1 to f1 (a2 to f2).

An inverter 107 for an electric motorcar or a hybrid car as a vehicle is connected between discharge ports c (between c1 and c2). A chiller (water heating evaporator) 108 to perform heat exchange between the refrigerant of the vehicle air conditioner and cooling water is connected between the discharge ports b. A water-cooled condenser 109 to perform heat exchange between the refrigerant of the vehicle air conditioner and the cooling water, and a heater core 110 are connected between the discharge ports a. A water-cooled battery 111 for an electric motorcar or a hybrid car as a vehicle is connected between the discharge ports d. For cooling or heating an air-cooled battery, not only the water-cooled battery, but a battery temperature control heat exchanger to perform heat exchange between fluid and air may be provided in an air guiding passage to the battery.

A compressor 112 forming a refrigerating cycle of the vehicle air conditioner compresses the refrigerant and sends it to the water-cooled condenser 109. The refrigerant passed and condensed through the water-cooled condenser 109 flows via an expansion valve 113 to the chiller 108 which can be regarded as a water heating evaporator. The heater core 110 is provided in an air conditioning duct through which an air conditioning wind 110f flows and warms the air conditioning wind toward a vehicle interior. The chiller 108 is provided in the air conditioning duct through which the air conditioning wind flows and cools the air conditioning wind toward the vehicle interior.

As described above, in FIG. 39, the discharge ports a are connected the channel of the water-cooled condenser 109 having the heater core 110 in the middle. The discharge ports b are connected to the channel of the chiller 108. The discharge ports c are connected to the inverter 107 (it may be an electrical unit such as a motor, a water-cooled intercooler or a cold heat storage device). The discharge ports d are connected to the water-cooled battery 111 (it may be a cold heat storage device or a ventilation heat recovery unit).

Although not illustrated, the refrigerating cycle may be a system having two low-pressure side heat exchangers with branched piping through which the refrigerant discharged from the water-cooled condenser 109 flows into the chiller and the evaporator.

Tenth Embodiment

Figure 40:
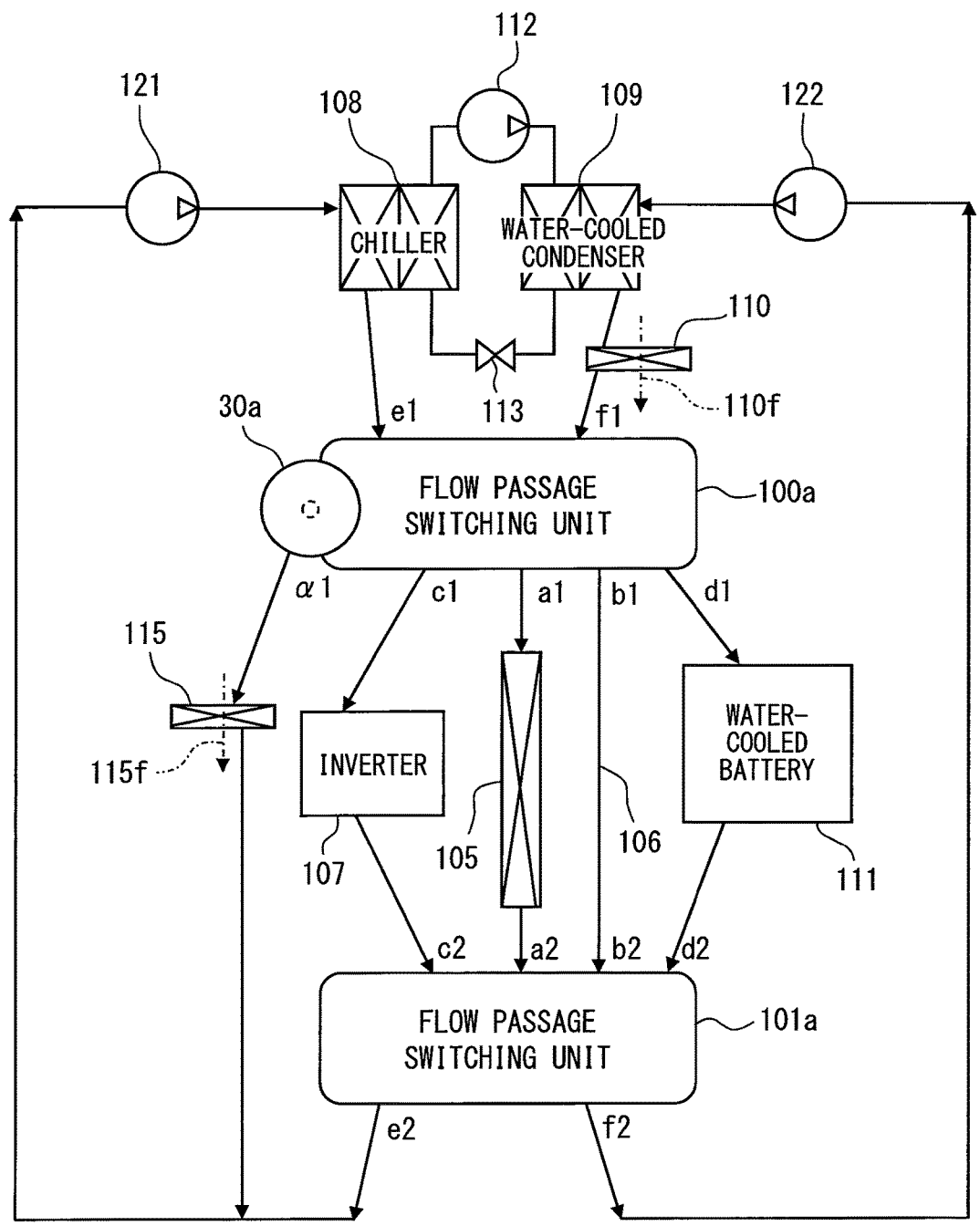
FIG. 40 is a piping structural diagram of the temperature controller of another in-vehicle device different from that in FIG. 39 using the flow passage switching unit showing a tenth embodiment.

Next, a tenth embodiment will be described. The characteristic features different from those in the above-described embodiments will be described. FIG. 40 shows another in-vehicle temperature controller using the flow passage switching unit showing the tenth embodiment, different from FIG. 39. In FIG. 40, two flow passage switching units 100a and 101a are provided, and plural in-vehicle devices are connected via piping between these flow passage switching units 100a and 101a. An independent control valve 30a independently driven with the flow passage switching unit in the eighth embodiment shown in FIG. 30 or the like is attached to the flow passage switching units 100a and 101a in FIG. 40.

In the flow passage switching unit 101a, the direction of the fluid which flows through the first common fluid piping 41 and first common fluid piping 42 in the flow passage switching unit in the eighth embodiment shown in FIG. 30 or the like is opposite. That is, the first common fluid piping 41 and the first common fluid piping 42 are both used as a discharge port.

Then, in the flow passage switching unit 100a, the independent control valve 30a is attached to the left end of e.g. the first common fluid piping 41 in FIG. 30. Note that the flow passage switching unit to be described later in FIG. 42 and FIG. 43 (twelfth and thirteenth embodiments), where this independent control valve is also integrated as a flow passage switching unit, may be used as the flow passage switching unit 100a in FIG. 40.

Further, in FIG. 40, when a chiller system pump (low-temperature system pump) 121 supplies water to a channel for circulation through the chiller 108, the flow passage switching unit 100a, the independent control valve 30a, a cooler core 115 and the flow passage switching unit 101a.

A water-cooled condenser system pump (high-temperature system pump) 122 supplies water to a channel for circulation through the water-cooled condenser 109, the heater core 110, the flow passage switching unit 100a, the water-cooled battery 111 and the like, and the flow passage switching unit 101a.

The discharge ports a to f shown in FIG. 30 and the like are denoted by a1 to f1 (a2 to f2) in FIG. 40. The radiator 105 to radiate heat of an unshown engine is connected between the discharge ports a (between a1 and a2). The radiator bypass channel 106 is connected between the discharge ports b. The inverter 107 for an electric motorcar or a hybrid car as a vehicle is connected between discharge ports c. The water-cooled battery 111 for an electric motorcar or a hybrid car as a vehicle is connected between the discharge ports d.

The compressor 112 forming the refrigerating cycle compresses the refrigerant and sends it to the water-cooled condenser 109. The refrigerant passed and condensed through the water-cooled condenser 109 flows via the expansion valve 113 to the chiller 108 which can be regarded as a water heating evaporator. The heater core 110 is provided in the air conditioning duct through which the air conditioning wind 110f flows and warms the air conditioning wind 110f toward the vehicle interior. The chiller 108 cools the water flowing inside by evaporation of the refrigerant, then the cooled water flows, and further, cools the cooler core 115 provided in the air conditioning duct and cools the air conditioning wind 115f.

As described above, in FIG. 40, the discharge ports a are connected to the channel of the radiator 105. The discharge ports b are connected to the radiator bypass channel 106. The discharge ports c are connected to the inverter 107 (it may be an electrical unit such as a motor). The discharge ports d are connected to the water-cooled battery 111 (it may be a cold heat storage device or a ventilation heat recovery unit). Further, the cooler core 115 of the vehicle air conditioner is connected to the downstream side (downstream side of the port a1) of the independent control valve 30a. The downstream side of the cooler core 115 is connected in the middle of the suction side piping of the chiller system pump (low-temperature system pump) 121.

Eleventh Embodiment

Figure 41:
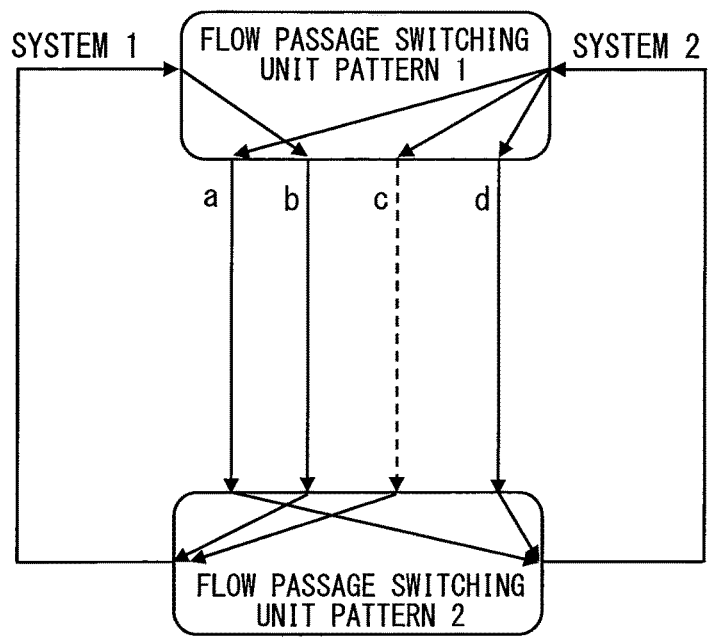
FIG. 41 is a schematic structural diagram of the temperature controller of another in-vehicle device using the flow passage switching unit showing an eleventh embodiment.

Next, an eleventh embodiment will be described. The characteristic features different from those in the above-described embodiments will be described. FIG. 41 shows the temperature controller in another in-vehicle device using a pair of flow passage switching units having the ports a to d showing the eleventh embodiment. In FIG. 41, the fluid in a system 2 discharged from the discharge port c, in the case of fluid flow pattern in FIG. 41, communicates with the system 1 side.

Assuming that the fluid has flowed to the discharge port c, as the capacity of the cooling system of the system 1 is approximately fixed, a channel to return the fluid from the system 1 to the system 2 is required (when the fluid continuously flows, the pressure of the system 1 is continuously increased). However, since there is no feedback channel, as a result, the fluid does not flow through the discharge port c indicated with a broken line, thus the flow passage is blocked.

That is, in the pair of oppositely-provided flow passage switching units, it is possible to block a particular flow channel by setting different operation patterns such as the pattern 1 and the pattern 2. Further, in one flow passage switching unit, as described in FIG. 31, merely eight patterns of operation patterns are generated as flow passage patterns, however, it is possible to generate eight or more patterns of flow passages including a pattern to block a particular channel by combining the two flow passage switching units.

Twelfth Embodiment

Next, a twelfth embodiment will be described. The characteristic features different from those in the above-described embodiments will be described. In the above-described eighth embodiment, as shown in FIG. 26, the peripheral wall 13 of the rotary valve 1 is provided with the first fluid ports 4L1 and 4R1. The first fluid ports 4L1 and 4R1 are respectively connected to the first common fluid piping 41 and the second common fluid piping 42.

Further, the peripheral wall 13 of the rotary valve 1 is provided with the second fluid ports 5L1 and 5R1. Similarly, the peripheral wall 13 of the rotary valve 2 is provided with the first fluid ports 4L2 and 4R2. The first fluid ports 4L2 and 4R2 are respectively connected to the first common fluid piping 41 and the second common fluid piping 42. Further, the peripheral wall 13 of the rotary valve 2 is provided with the second fluid ports 5L2 and 5R2. Then it is possible to realize the eight operation patterns shown in FIG. 31.

In the twelfth embodiment described below, an independent multidirectional valve (not limited to a four-way valve), in which its internal valving element is rotate-controlled independently of the rotary valves 1 and 2, is added to the first common fluid piping 41 or the second common fluid piping 42 in the above-described eighth embodiment. Although independent control is performed, however, the driving mechanism may be commonly used, or independent control may be performed by using a motive-power distribution mechanism from the signal driving source.

Figure 42:
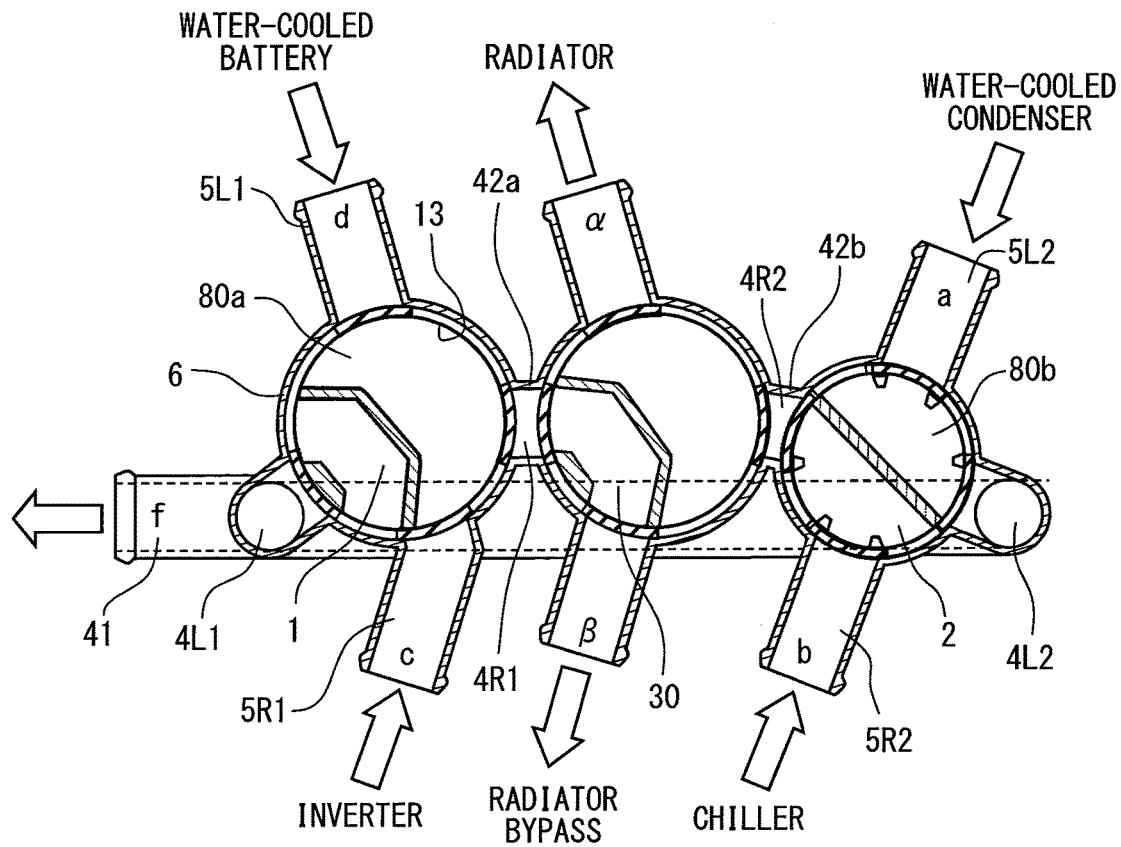
FIG. 42 is a partial cross-sectional diagram of the flow passage switching unit showing a twelfth embodiment.

FIG. 42 shows the flow passage switching unit as the twelfth embodiment. It is possible to use the flow passage switching unit in FIG. 42 as e.g. the flow passage switching unit 101 in FIG. 39 (the ports a to d, e, α and β in FIG. 42 correspond to the ports a2 to d2, e2, α2, and β2 in FIG. 39).

In FIG. 42, the port a receives a water flow from the water-cooled condenser 109 via the heater core 110. The port b receives a water flow from the chiller 108. The port c receives a water flow from the inverter 107. The port d receives a water flow from the water-cooled battery 111.

Further, the fluid flows through the one piping 41 of the common fluid pipings 41 and 42 of the rotary valves 1 and 2, as the port f, via a bypass channel of the water-cooled battery 111 (FIG. 39), to an internal circulation system pump 104. Further, the other piping 42 (42a and 42b) of the common fluid pipings 41 and 42 of the rotary valves 1 and 2 is connected to the independent four-way control valve 30, and a water flow is discharged from the ports α and β from the independent four-way control valve 30 to the radiator 105 and the radiator bypass channel 106.

The rotary valves 1 and 2 in FIG. 42 have a mechanism to interlock-rotate at the rotation angle ratio of 4:5 as in the case of the eighth embodiment, and the valving elements 80a and 80b are driven with the single driving source. The independent four-way control valve 30 has the same valve structure as that of the rotary valve 1. It is driven independently of the rotary valves 1 and 2 with another driving source (motor) different from the driving source for the rotary valves 1 and 2.

In the twelfth embodiment, apposed plural rotary valves 1 and 2 are provided. The respective rotary valves 1 and 2 have the casing 6, the side walls which are formed inside the casing 6 and which are opposed (the side walls are positioned on the front side and back side of the sheet of FIG. 42 and they are not shown), and the peripheral wall 13 formed between these side walls.

The respective rotary valves 1 and (2) have at least one of the first fluid ports 4L1 and 4R1 (4L2 and 4R2) (generally referred to as 4L and 4R) provided in the peripheral wall 13. Further, the second fluid ports 5L1 and 5R1 (5L2 and 5R2) (generally referred to as 5L and 5R) are provided in the peripheral wall 13. In addition, the valving element 80a (80b) (generally referred to as 8) rotatably supported with the rotary shaft extending in a direction connecting the opposed side walls in the casing 6 is provided. Then, by the rotation of the valving element 8, a fluid passage where the first fluid ports (4L and 4R) and the second fluid ports (5L and 5R) selectively communicate with each other is formed.

Further, as in the case of the first embodiment, the driving mechanism to drive the respective valving elements 8 by respectively predetermined rotation angles is provided. The driving mechanism 1 has the single driving source and the motive power transmission member to transmit the rotation motive power of the single driving source motive power to the respective rotary valves 1 and 2. Then, the motive power of the motor as a driving source is transmitted to the respective rotary shafts of the plural rotary valves 1 and 2 to drive the respective valving elements 8 such that their positions with respect to the first fluid ports 4L and 4R and the second fluid ports 5L and 5R become mutually different.

Next, the respective first fluid ports 4L and 4R of the plural rotary valves 1 and 2 are connected to the common fluid pipings 41 and 42. In FIG. 42, the common fluid piping 42 is branched to 42a and 42b, and the independent control valve 30 is added between the common fluid pipings 42a and 42b. Note that the independent control valve 30 is driven with another motor different from the motor to drive the respective rotary valves 1 and 2.

The plural rotary valves 1 and 2 are mechanically connected to the common fluid pipings 41 and 42. The plural valving elements 8 connected to the driving mechanism 21 repeat rotating by respectively predetermined rotation angles and stopping. At least a pair of valving elements 8 rotate by mutually different rotation angles and stop.

The first fluid ports 4L and 4R have one side piping 4L and other side piping 4R communicating with the inside of the casing 6 in mutually different positions. The common fluid pipings 41 and 42 have the first common fluid piping 41 and the second common fluid piping 42 (42a and 42b) through which different fluids flow.

The plural rotary valves 1 and 2 between the first common fluid piping 41 and the second common fluid piping 42 (42a and 42b) are connected via the first common fluid piping 41 and the second common fluid piping 42. Further, although not shown in FIG. 42, as in the case of the first embodiment, the motor as a driving source rotates the common shaft extending in parallel with the apposition direction of the rotary valves 1 and 2, and the respective rotary valves 1 and 2 are driven via the common shaft.

Further, as in the case of the first embodiment, in the plural rotary valves 1 and 2, the respective rotary shafts are arrayed in a right angled direction with respect to the apposition direction of the plural rotary valves 1 and 2, and provided in mutually parallel with each other. Then, the unshown driving mechanism has a gear train rotated with a driving source.

Further, in FIG. 42, the common fluid piping 42 is branched to 42a and 42b, and the independent control valve 30 is added between the common fluid pipings 42a and 42b.

That is, the common fluid piping 42 is provided with the independent control valve 30 having a rotary valve where valve switching is performed independently of the plural rotary valves 1 and 2. The independent control valve 30 is provided between the plural rotary valves 1 and 2. In the independent control valve 30, two of four ports are connected to the common fluid pipings 42a and 42b.

The effects of the twelfth embodiment will be described. The respective first fluid ports 4L and 4R of the plural rotary valves 1 and 2 are connected to the pair of common fluid pipings 41 and 42. The one common fluid piping 42 is branched to two common fluid piping parts 42a and 42b. The independent control valve 30 controlled independently of the plural rotary valves 1 and 2 is provided between the common fluid piping parts 42a and 42b.

According to this arrangement, it is possible to distribute the fluid from a position between the common fluid piping parts 42a and 42b to arbitrary piping regardless of control status of the plural rotary valves 1 and 2. Further, the independent control valve 30 itself is integrated with at least the one common fluid piping 42. In addition, as the plural rotary valves 1 and 2 are mechanically connected to the common fluid pipings 41 and 42, it is possible to enhance the connection strength of the plural rotary valves with the common fluid piping and the independent control valve 30.

Further, the independent control valve 30 has a rotary valve where vale switching is performed independently of the plural rotary valves 1 and 2. The independent control valve 30 is provided between the plural rotary valves 1 and 2. In the independent control valve 30, at least two of plural ports are connected to the common fluid pipings 42a and 42b.

According to this arrangement, as the independent control valve 30 is provided between the plural rotary valves 1 and 2, piping connection is facilitated in a piping system where the piping connected to the independent control valve 30 is positioned at a central part of the flow passage switching unit.

Thirteenth Embodiment

Figure 43:
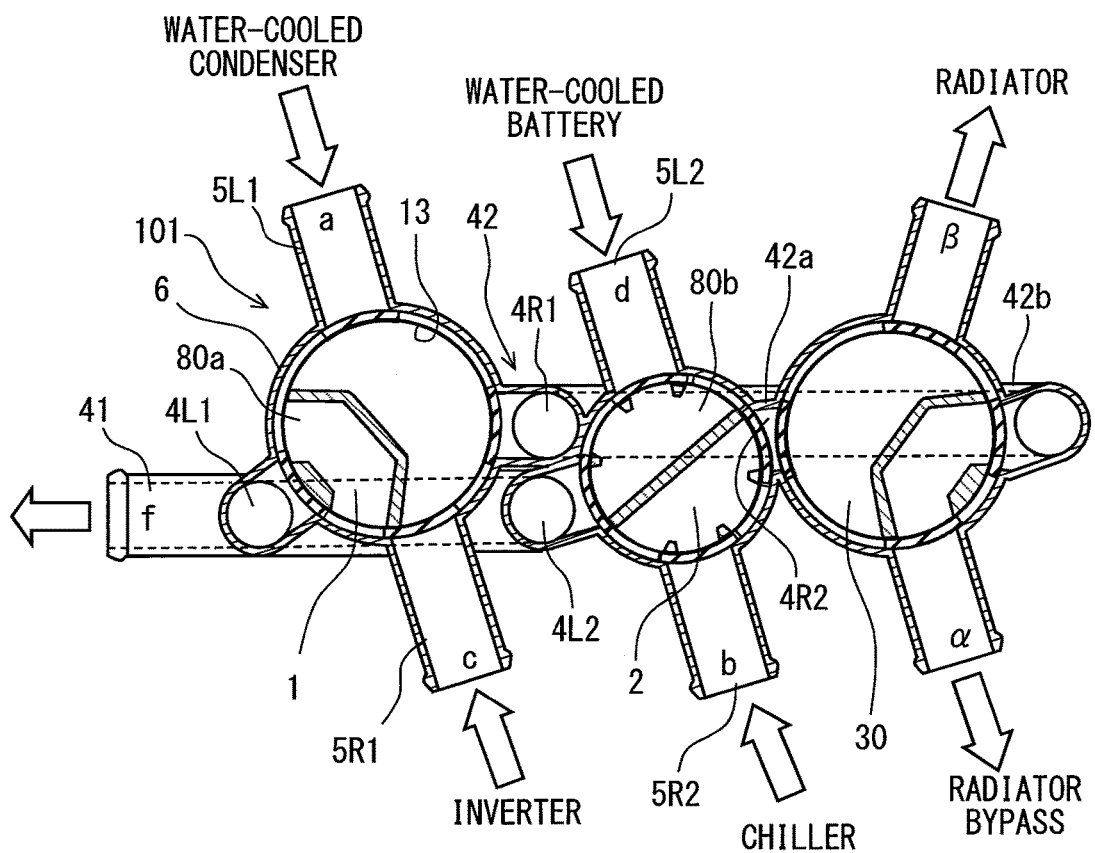
FIG. 43 is a partial cross-sectional diagram of the flow passage switching unit showing a thirteenth embodiment.

Next, a thirteenth embodiment will be described. The characteristic features different from those in the above-described embodiments will be described. FIG. 43 is a partial cross-sectional diagram of the flow passage switching unit showing the thirteenth embodiment. The flow passage switching unit in FIG. 43 can be used as e.g. the flow passage switching unit 101 in FIG. 39. In FIG. 43, the port a receives a water flow from the water-cooled condenser 109 via the heater core 110. The port b receives a water flow from the chiller 108. The port c receives a water flow from the inverter 107. The port d receives a water flow from the water-cooled battery 111.

Further, the fluid flows through the one piping 41 of the common fluid pipings of the rotary valves 1 and 2, as a port (f2), via the bypass channel 111b of a water-cooled battery, to the internal circulation system pump 104. Further, the other one piping 42 (42a and 42b) of the common fluid pipings of the rotary valves 1 and 2, is connected to the independent four-way control valve 30, and the water flow is discharged from the ports α and β (α2 and β2) from the independent four-way control valve 30.

As in the case of the first embodiment, the rotary valves 1 and 2 have a valve structure to interlock-rotate at the rotation angle ratio of 4:5, and the valving elements 80a and 80b are driven with the single driving source. The independent four-way control valve 30 is driven independently of the rotary valves 1 and 2 with another driving source (motor) different from the driving source for the rotary valves 1 and 2.

In the thirteenth embodiment, the apposed plural rotary valves 1 and 2 are provided. Then the respective rotary valves 1 and 2 have the casing 6, the side walls which are formed inside the casing 6 and which are opposed (the side walls are positioned on the front side and back side of the sheet of FIG. 43 and they are not seen), and the peripheral wall 13 formed between these side walls.

The respective rotary valves 1 and (2) have at least one first fluid ports 4L1 and 4R1 (4L2 and 4R2) (generally referred to as 4L and 4R) provided in the peripheral wall 13, and the second fluid ports 5L1 and 5R1 (5L2 and 5R2) provided in the peripheral wall 13. In addition, the valving element 80*a* (80*b*) (generally referred to as 8) rotatably supported with the rotary shaft extending in a direction connecting the opposed side walls inside the casing 6 is provided. Then by the rotation of the valving element 8, a flow passage where the first fluid ports (4L and 4R) and the second fluid ports (5L and 5R) selectively connected with each other is formed.

Further, as in the case of the first embodiment, the driving mechanism to drive the respective valving elements 8 by respectively predetermined rotation angles is provided. The driving mechanism has the single driving source and the motive power transmission member to transmit the rotation motive power of the single driving source to the respective rotary valves 1 and 2. Then, the motive power of the motor as a driving source is transmitted to the respective rotary shafts of the plural rotary valves 1 and 2, to perform driving until the positions of the respective valving elements 8 with respect to the first fluid ports 4L and 4R and the second fluid ports 5L and 5R become mutually different.

Next, the respective first fluid ports 4L and 4R of the plural rotary valves 1 and 2 are connected to the common fluid piping 41 and the common fluid piping 42 (42*a* and 42*b*). In FIG. 43, the common fluid piping 42 is branched to 42*a* and 42*b*, and the independent control valve 30 is added between the common fluid pipings 42*a* and 42*b*. The independent control valve 30 is driven with another motor different from the above-described motor to drive the rotary valves 1 and 2.

The plural rotary valves 1 and 2 are mechanically connected to the common fluid pipings 41 and 42. The plural valving elements 8 connected to the unshown driving mechanism repeat rotating by respectively predetermined rotation angles and stopping. At least one pair of valving elements 8 rotate by mutually different rotation angles and stop.

The first fluid ports 4L and 4R have the one side piping 4L and the other side piping 4R communicating with the inside of the casing 6 in mutually different positions. The common fluid pipings 41 and 42 have the first common fluid piping 41 and the second common fluid piping 42 through which different fluids respectively flow. The plural rotary valves 1 and 2 between the first common fluid piping 41 and the second common fluid piping 42 are connected via the first common fluid piping 41 and the second common fluid piping 42. Further, although not shown in FIG. 43, as in the case of the first embodiment, the motor as a driving source rotates the common shaft extending in parallel with the apposition direction of the rotary valves 1 and 2, and the respective rotary valves 1 and 2 are driven via the common shaft.

Further, as in the case of the first embodiment, in the plural rotary valves 1 and 2, the respective rotary shafts are arrayed in the right angled direction with respect to the apposition direction of the plural rotary valves 1 and 2, and provided in parallel with each other. Then the unshown driving mechanism has a gear train rotated with a driving source.

Further, in FIG. 43, the common fluid piping 42 is branched into 42*a* and 42*b*, and the independent control valve 30 is added between the common fluid pipings 42*a* and 42*b*.

That is, the independent control valve 30 having a rotary valve where valve switching is performed in dependently of the plural rotary valves 1 and 2 is provided between the common fluid piping 42*a* and 42*b*. The independent control valve 30 is provided at the end of the plural rotary valves 1 and 2. In the independent control valve 30, two of the four ports are connected to the common fluid pipings 42*a* and 42*b*. Further, by providing the independent control valve 30 and at least one of the rotary valves 1 and 2 with the same valve structure, manufacturing is facilitated.

The effects of the thirteenth embodiment will be described. The respective first fluid ports 4L and 4R of the plural rotary valves 1 and 2 are connected to the pair of common fluid pipings 41 and 42. The one common fluid piping 42 is branched to the two common fluid piping parts 42*a* and 42*b*. The independent control valve 30 controlled independently of the plural rotary valves 1 and 2 is provided between the common fluid piping parts 42*a* and 42*b*.

According to this arrangement, it is possible to distribute the fluid from a position between the common fluid piping parts 42*a* and 42*b* to arbitrary piping regardless of control status of the plural rotary valves 1 and 2. Further, the independent control valve 30 itself is integrated with at least one common fluid piping 42. In addition, as the plural rotary valves 1 and 2 are mechanically connected to the common fluid pipings 41 and 42, it is possible to enhance the connection strength of the plural rotary valves with the common fluid piping and the independent control valve 30.

Further, the independent control valve 30 has a rotary valve where the vale switching is performed independently of the plural rotary valves 1 and 2. Then the independent control valve 30 is provided at the end of the plural rotary valves 1 and 2. In the independent control valve 30, at least two of the plural ports are connected to the common fluid pipings 42*a* and 42*b*.

According to this arrangement, as the independent control valve 30 is provided at the end, it is possible to provide the plural rotary valves 1 and 2 in positions close to each other. Accordingly, it is possible to form the driving mechanism having the single driving source and the motive power transmission member to transmit the rotation motive power of the single driving source to the respective rotary valves 1 and 2 as a compact mechanism. Further, it is possible to facilitate piping connection when the piping connected to the independent control valve 30 is positioned at the end of the flow passage switching unit.

Next, in the eighth embodiment, the twelfth embodiment and the thirteenth embodiment, the plural rotary valves 1 and 2 are provided. In at least one rotary vale of the rotary valves 1 and 2 (for example, 1, the same in hereinbelow), the plural first fluid ports (4L1 and 4R1) and the plural second fluid ports (5L1 and 5R1) are provided. Then, a valve operation pattern in which any first fluid port (4L1 or 4R1) communicates with at least two second fluid ports (5L1 and 5R1) is provided.

According to this arrangement, as a valve operation pattern such that any first fluid port (4L1 or 4R1) communicates with at least two second fluid ports (5L1 and 5R1) is provided, it is possible to distribute the fluid in the same system to plural devices connected to the respective ports.

Further, in the eighth embodiment, the twelfth embodiment and the thirteenth embodiment, as shown in FIG. 39 and FIG. 40, respectively different types of fluids (fluids in different temperature bands or the like) flow through the plural first fluid ports (4L1 and 4R1). Then there are plural positions of the valving elements (80*a* and 80*b*) in which the communication status between the plural first fluid ports (4L1 and 4R1) is blocked with the partition walls (8*ak*, 8*bk*) provided in the valving elements (80*a* and 80*b*).

According to this arrangement, the fluids at respectively different temperatures flow through the plural first fluid ports (4L1 and 4R1). Then there are plural positions of the valving elements (80a and 80b) in which the communication status between the plural first fluid ports (4L1 and 4R1) is blocked with the partition walls (8ak, 8bk) provided in the valving elements (80a and 80b). Accordingly, it is possible to form a hydraulic circuit having a fluid switching device in which fluids at different temperatures do not mix.

Further, the driving mechanism (21) drives the valving elements (8) to the positions of the valving elements (80a and 80b) in which the communication status between the plural first fluid ports (4L1 and 4R1) is blocked with the partition walls (8ak and 8bk) provided in the valving elements (80a and 80b) and stops them. According to this arrangement, it is possible to continuously pass the fluid through a desired device in the hydraulic circuit having a fluid switching device where fluids at different temperatures do not mix.

Next, the rotation angle of the valving element (8) after the driving mechanism (21) drives the valving element (8) until the driving mechanism (21) stops the valving element (8) differs in the respective plural rotary valves 1 and 2. According to this arrangement, it is possible to set plural stop positions with the single driving mechanism (21) and it is possible to perform switching among the plural flow passages.

Further, the rotation angle of the valving element (8) after the driving mechanism (21) drives the valving element (8) until the driving mechanism (21) stops the valving element (8) differs in the respective plural rotary valves 1 and 2. Then, when it is assumed that the ratio between the different rotation angles is R1 to R2 (R1/R2), there is no other common divisor but 1 between R1 and R2. For example, the rotation angle ratio R1 to R2 may be 4 to 7, 2 to 3, 5 to 6, 7 to 6, 8 to 9 and 9 to 10 in addition to 4 to 5. According to this arrangement, it is possible to set plural stop positions with the single driving mechanism (21), and it is possible to perform switching among the plural flow passages. Note that note that slight shift such as 4.1 to 4.9 is allowable.

Further, the rotary valves 1 and 2 have a four-way valve. At least one rotary valve of the rotary valves 1 and 2 (for example, 1, the same hereinbelow) has plural first fluid ports (4L1 and 4R1) and plural second fluid ports (5L1 and 5R1). Any one port of the plural first fluid ports (4L1 and 4R1) is blocked with the partition wall of the valving element 8. Further, the rotary valves 1 and 2 have operation patterns of the valve for communication between the unblocked remaining first fluid ports (4L1 and 4R1) and the second fluid ports (5L1 and 5R1).

In addition, as shown in FIG. 39 or FIG. 40, the fluid flow passage switching unit in the present disclosure is provided upstream and downstream positions from plural devices connected in parallel, with the devices therebetween, in pair, to control fluid flowing through the respective devices.

Modifications of the above-described plural embodiments will be described. The present disclosure is not limited to the above-described first embodiment to thirteenth embodiment, but it may be modified or expanded as follows. In the above-described embodiments, the embodiment where the first rotary valve, the second rotary valve . . . the N-th rotary valve are apposed and the rotation angle ratio among the internal respective valving elements is set to 1:2: . . . 2 to the (N−1)th power, however, the present disclosure is not limited to this arrangement. It may be arranged such that the rotation angle ratio is slightly changed with respect to the rotation angle ratio 1:2: . . . 2 to the (N−1)th power.

In brief, although the number of patterns is limited, it may be arranged such that as the "rotation angle ratio of the respective valving elements of the first rotary valve, the second rotary valve . . . the N-th rotary valve" to realize plural flow passage patterns, first rotary valve<second rotary valve< . . . the N-th rotary valve holds.

Note that in this case, among the valving elements in the plural rotary valves, a part of them may have a connection structure to be rotated at exactly the same rotation angle. Accordingly, an embodiment having plural rotary valves which merely satisfies a requirement that in the combination of at least one pair of rotary valves, the rotation angles of the valving elements in the respective rotary valves are mutually different, is also included in the present disclosure.

In the first embodiment to the thirteenth embodiment, when a simple structure where the motor forming the single driving source rotates only in one direction is adopted, means for detecting the operation pattern for the rotary valve is mounted in the first rotary valve. In this case, when the first rotary valve rotates by a detectable range of the rotation angle detection device, a rotation angle ratio to return all the rotary valves including the first rotary valve to the initial status is required. This rotation angle ratio is a gear ratio between the driving side gear train driven with the common shaft and the driven side gear to drive the valving element.

In a case where the relation of the rotation angle ratio or the gear ratio is failed, when the rotation angle detection device rotates by the detectable range or wider range, its valve pattern cannot be recognized. Accordingly, as the relation of the rotation angle ratio, it is required that the rotation angle ratio of one or more pairs of valving elements is "1:1" or "1:N" (N is an arbitrary natural number) ("N:1" or the like has the same meaning). Note that when the motor is irreversible, arbitrary relation of gear ratio is possible within the detectable range of the rotation angle detection device.

In the respective above-described first embodiment to thirteenth embodiment, the respective rotary valves are driven at uniform initial angle of the valving element, however, the initial positions may be intentionally shifted. For example, initial positional difference (shift) of 180 degrees may be set between a pair of rotary valves. Further, the sizes of the respective rotary valves may be slightly changed, otherwise, the valving elements may have mutually different shapes.

Figure 44:
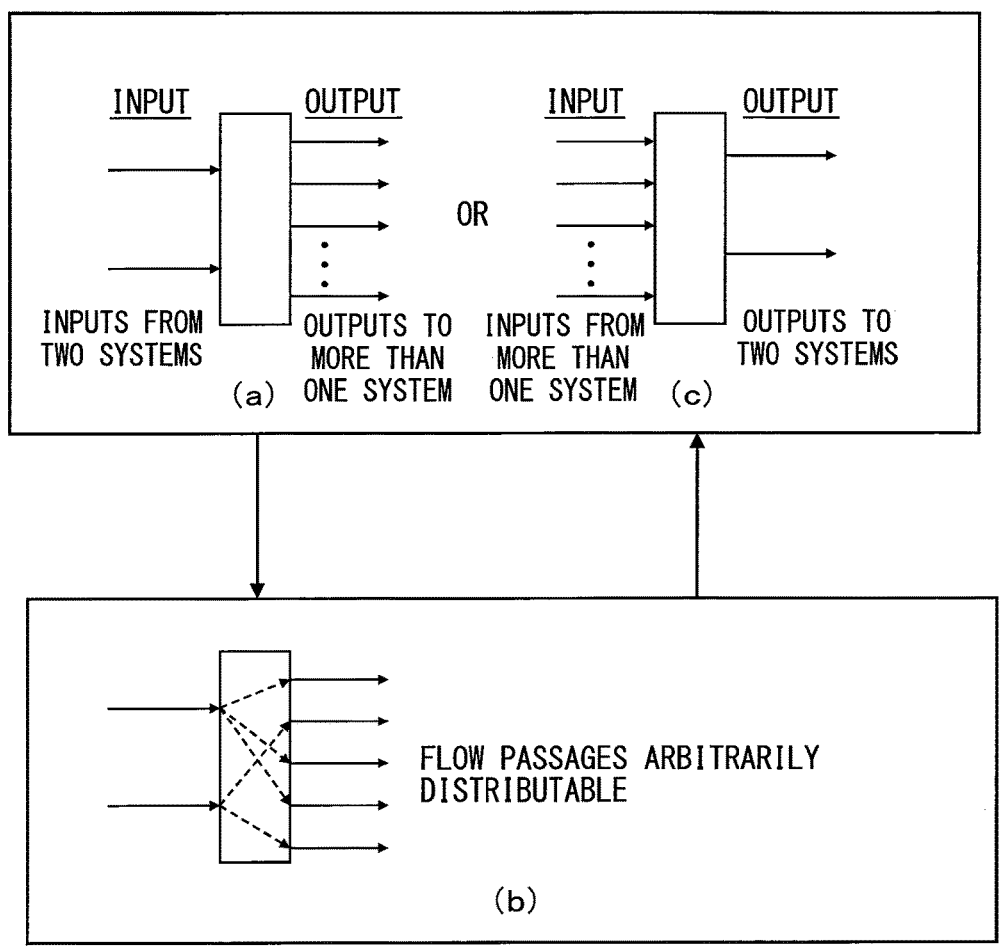
FIG. 44 is an explanatory diagram explaining effects and another structure of the present disclosure.

Next, as shown in (a) in FIG. 44, in a flow passage switching unit where two system inputs (fluid inflow ports) exist and plural system outputs (fluid discharge ports) exist, the flow passages can be arbitrarily distributed as shown in (b) in FIG. 44. Then when N outputs exist, it is possible to obtain a flow passage switching unit capable of flow passage switching in 2 to Nth power patterns.

Further, as shown in (c) in FIG. 44, it may be arranged such that the inflow port is changed to the discharge port, and the discharge port is changed to the inflow port to reverse the flow of fluid. In this case, a flow passage switching unit where plural system inputs exist on the input side and two system outputs exist on the output side is obtained.

As described above, conventionally, a large number of driving sources have been required, however, by employing the above-described respective embodiments, it is possible to obtain the unit with a single driving source. It is possible to realize cost reduction by reduction of the number of parts, and improvement in loadability in a vehicle by downsizing of physical constitution. Further, it is possible to realize arbitrary flow regulation in some rotary valve or a fluid shut function of some rotary valve by appropriately setting the numerical values of the above-described α, γo, β, in addition to the flow passage switching.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A flow passage switching unit comprising:
   a plurality of rotary valve parts which are arranged side by side and each of which includes:
   a casing that defines therein a space;
   side walls that are opposed to each other;
   a peripheral wall that is formed between the side walls;
   at least one first fluid port that is provided for the peripheral wall;
   at least one second fluid port that is provided for the peripheral wall or a part of the side walls;
   a rotary shaft that extends in a direction connecting the opposed side walls in the casing; and
   a valving element that is supported rotatably by the rotary shaft, wherein a flow passage, through which the at least one first fluid port and the at least one second fluid port selectively communicate with each other, is formed by rotation of the valving element; and
   a driving mechanism that drives the valving element by its corresponding predetermined rotation angle and that includes:
   a single driving source; and
   a motive power transmission member that transmits rotation motive power of the single driving source respectively to the plurality of rotary valve parts, wherein the motive power transmission member transmits the motive power of the single driving source to the rotary shaft to drive the valving element to a position, the position of the valving element relative to the at least one first fluid port and the at least one second fluid port being different from one another among the plurality of rotary valve parts, the flow passage switching unit further comprising common fluid pipes that are connected respectively to the at least one first fluid port, wherein the plurality of rotary valve parts are mechanically connected to the common fluid, wherein:
   the at least one first fluid port includes one side pipe and an other side pipe which communicate with inside of the casing at different positions from each other;
   the common fluid pipes include a first common fluid pipe and a second common fluid pipe through which fluids with different properties flow respectively;
   the plurality of rotary valve parts located between the first common fluid pipe and the second common fluid pipe are connected together via the first common fluid pipe and the second common fluid pipe;
   the rotary shaft of each of the plurality of rotary valve parts is arranged in a direction perpendicular to a direction in which the plurality of rotary valve parts are arranged side by side, and is arranged parallel to one another among the plurality of rotary valve parts; and
   the driving mechanism includes a gear train that is rotated by the single driving source.

2. The flow passage switching unit according to claim 1, wherein:
   the valving element, which is connected to the driving mechanism, is repeatedly rotated by its corresponding predetermined rotation angle and stopped; and
   the valving element of each of at least a pair of the plurality of rotary valve parts is rotated by a different rotation angle from one another among the at least a pair of the plurality of rotary valve parts, and is stopped.

3. The flow passage switching unit according to claim 1, wherein:
   the valving element of each of the plurality of rotary valve parts is rotated by a different rotation angle from one another among all the plurality of rotary valve parts, and is stopped; and
   a ratio of the rotation angle of the valving element between the plurality of rotary valve parts is 1 to 2 to the $(N-1)^{th}$ power, N being an arbitrary natural number except 0 (zero).

4. The flow passage switching unit according to claim 1, wherein:
   the motive power transmission member includes a common shaft extending parallel to a direction in which the plurality of rotary valve parts are arranged side by side;
   the single driving source rotates the common shaft; and
   the plurality of rotary valve parts are driven via the common shaft.

5. The flow passage switching unit according to claim 4, wherein:
   the plurality of rotary valve parts include a first rotary valve part, a second rotary valve part and a third rotary valve part;
   the driving mechanism includes a first rotation body that drives the first rotary valve part, a second rotation body that drives the second rotary valve part, and a third rotation body that drives the third rotary valve part;
   the second rotation body and the third rotation body are driven by the common shaft, which is a shaft of the first rotation body; and
   the valving element of each of the first rotary valve part, the second rotary valve part and the third rotary valve part is connected to a corresponding one of the first rotation body, the second rotation body, and the third rotation body.

6. The flow passage switching unit according to claim 1, wherein the valving element has a circular arc shape.

7. The flow passage switching unit according to claim 5, wherein the single driving source is disposed between any adjacent two rotation bodies of at least the first rotation body, the second rotation body, and the third rotation body.

* * * * *